(12) United States Patent
Sumi et al.

(10) Patent No.: US 6,243,326 B1
(45) Date of Patent: Jun. 5, 2001

(54) RECORDING AND REPRODUCTION DEVICE FOR A MAGNETO-OPTIC RECORDING MEDIUM CAPABLE OF RECORDING INFORMATION ACCORDING TO OPTICAL SUPER-RESOLUTION

(75) Inventors: Satoshi Sumi, Gifu; Yoshihisa Suzuki, Bisai; Atsushi Yamaguchi, Ogaki; Kenji Tanase, Gifu; Yoshiharu Uchihara; Kenji Torazawa, both of Ogaki; Seiji Murata, Izumi, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/101,800

(22) PCT Filed: Feb. 20, 1997

(86) PCT No.: PCT/JP97/00468
§ 371 Date: Oct. 19, 1998
§ 102(e) Date: Oct. 19, 1998

(87) PCT Pub. No.: WO97/31373
PCT Pub. Date: Aug. 28, 1997

(30) Foreign Application Priority Data

| Feb. 29, 1996 | (JP) | ................................... 8-035028 |
| Feb. 29, 1996 | (JP) | ................................... 8-043682 |
| Sep. 26, 1996 | (JP) | ................................... 8-255065 |

(51) Int. Cl.[7] ................................... G11B 11/00

(52) U.S. Cl. ........................ 369/13; 369/59.1; 369/124.01

(58) Field of Search ........................ 369/13, 116, 275.2, 369/110.01, 124.01, 275.1, 59.1, 59.11, 107, 14, 47.15, 53.1, 112.01; 360/59, 114; 428/694 DE, 694 EC

(56) References Cited

U.S. PATENT DOCUMENTS

| 5,561,656 | * | 10/1996 | Hurst, Jr. | ............................ 369/124 |
| 5,691,072 | * | 11/1997 | Izumi et al. | . |
| 5,691,963 | * | 11/1997 | Hirokane et al. | ...................... 369/13 |

FOREIGN PATENT DOCUMENTS

| 2-308460 | 12/1990 | (JP) . |
| 4-344352 | 11/1992 | (JP) . |

(List continued on next page.)

OTHER PUBLICATIONS

Proceedings of Magneto–Optical Recording International Symposium '94, J. Magn Soc. Jpn., vol. 19, Supplemnet No. S1 (1995), pp. 273–278, 1994 by The Magnetics Society of Japan.

Proc.Int. Symp. on Optical Memory, 1989; Japanese Journal of Applied Physics, vol. 28 (1989) Supplement 28–3, pp. 197–200.

Primary Examiner—Ali Neyzari
(74) Attorney, Agent, or Firm—Armstrong Westerman Hattori McCleland & Naughton, LLP

(57) ABSTRACT

A magneto-optic disk and a recording/reproduction device therefor adopt optical super-resolution to increase recording capacity. More specifically, the magneto-optic disk has an heat emitting layer (6) on a recording layer (4) and still preferably has an intermediate layer (8) between a reproduction layer (3) and the recording layer (4). The recording/reproduction device includes a circuit (33) for pulsing a laser beam to be radiated to the magneto-optic disk and still preferably includes a polarization rotating unit (50) and a polarizing filter (51) for blocking only the center of the laser beam in reproduction. The heat emitting layer (6) diffusing any heat generated by the laser beam, and the discontinuously radiated laser beam allow small recording domain. The laser beam having its center blocked forms smaller main lobe due to diffraction effect.

5 Claims, 33 Drawing Sheets

FOREIGN PATENT DOCUMENTS

| | | |
|---|---|---|
| 4-368647 | 12/1992 | (JP) . |
| 5-225602 | 9/1993 | (JP) . |
| 6-223424 | 8/1994 | (JP) . |
| 6-325417 | 11/1994 | (JP) . |
| 7-230637 | 8/1995 | (JP) . |
| 8-7351 | 1/1996 | (JP) . |
| 8-77640 | 3/1996 | (JP) . |
| 8-315435 | 11/1996 | (JP) . |
| 9-35351 | 2/1997 | (JP) . |

* cited by examiner

| SYNC<br>(4) | ADDRESS<br>(24) | CRC<br>(14) |
|---|---|---|

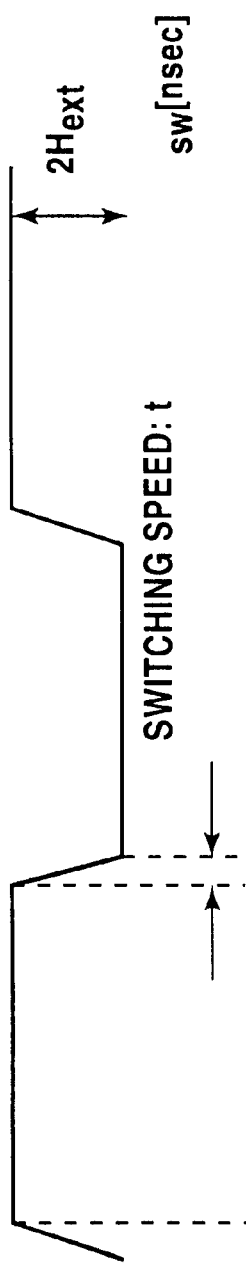
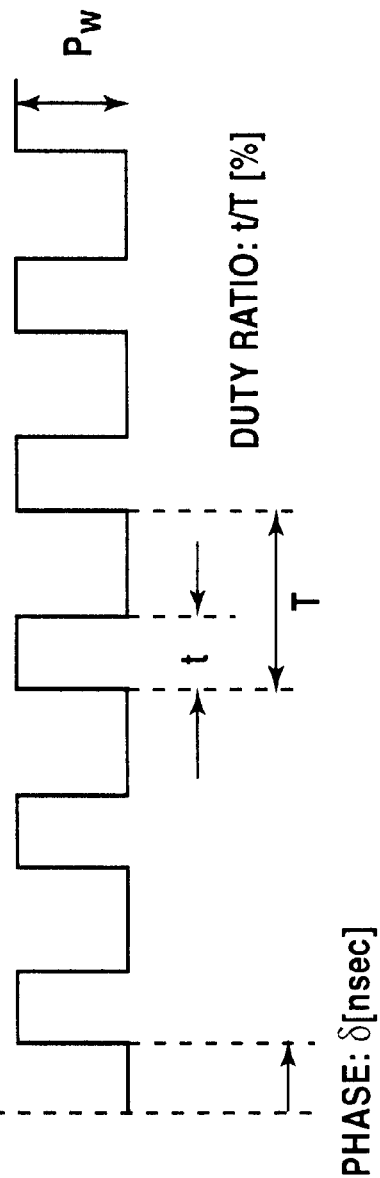
FIG.12A
FIG.12B

FIG.14A
SECTOR FORMAT FOR REC-TYPE
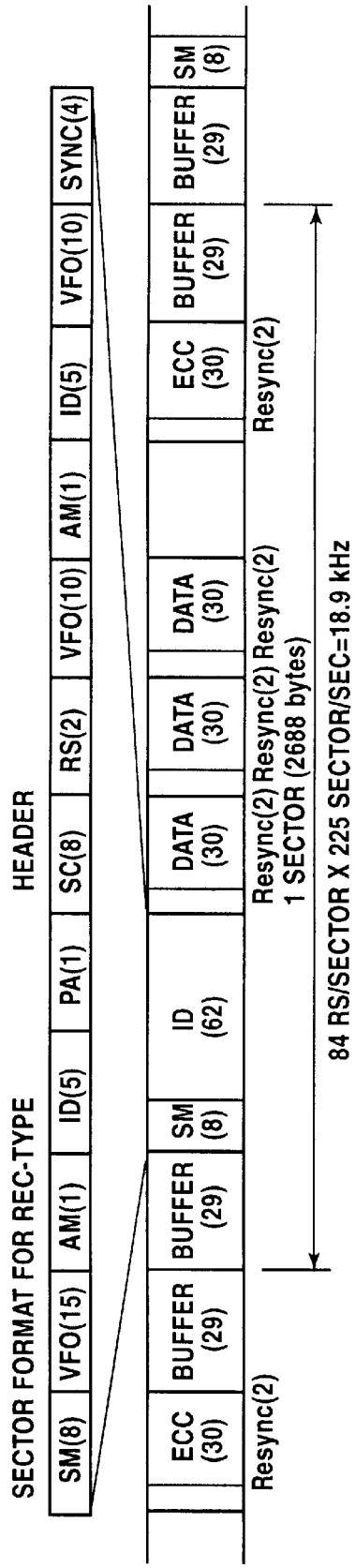
HEADER
Resync(2) Resync(2) Resync(2)
1 SECTOR (2688 bytes)
84 RS/SECTOR × 225 SECTOR/SEC=18.9 kHz
FIG.14B
SECTOR FORMAT FOR ROM-TYPE
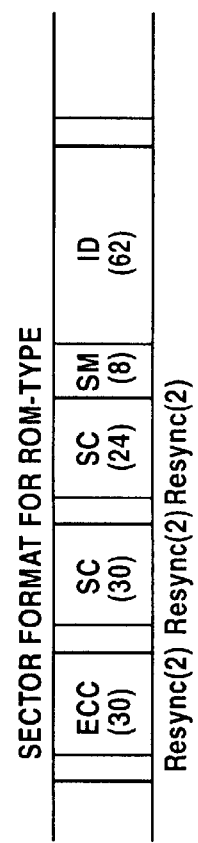
Resync(2) Resync(2)
FIG.14C
S M : 1000001000000-------------001000000001000000000100000
        6T   12T   6T   12T   6T   12T  12T  8T   8T   6T
VFO:01010101-----010101
A M :000000010x0      x:FOLLOWS
R S:00100000001000000010z00y     z:DC  y:FOLLOWS
                8T     8T

FIG. 15 DATA FIELD CONFIGURATION

← 2 BYTES →

| | D1 | D1 | D3 | D4 | D5 | D6 | D7 | D8 | D9 | D10 |
|---|---|---|---|---|---|---|---|---|---|---|
| Resync 0 | D1 | D1 | D3 | D4 | D5 | D6 | D7 | D8 | D9 | D10 |
| | D11 | D12 | D13 | D14 | D15 | D16 | D17 | D18 | D19 | D20 |
| | D21 | D22 | D23 | D24 | D25 | D26 | D27 | D28 | D29 | D30 |
| Resync 1 | D31 | D32 | D33 | D34 | D35 | D36 | D37 | D38 | D39 | D40 |
| | D41 | D42 | D43 | D44 | D45 | D46 | D47 | D48 | D49 | D50 |
| | D51 | D52 | D53 | D54 | D55 | D56 | D57 | D58 | D59 | D60 |
| Resync 2 | D61 | D62 | D63 | D64 | D65 | D66 | D67 | D68 | D69 | D70 |
| Resync 34 | D1021 | D1022 | D1023 | D1024 | P1,1 | P1,2 | P1,3 | P1,4 | P2,1 | P2,2 |
| | P2,3 | P2,4 | P3,1 | P3,2 | P3,3 | P3,4 | C1 | C2 | C3 | C4 |
| | E1,1 | E2,1 | E3,1 | E4,1 | E5,1 | E6,1 | E7,1 | E8,1 | E9,1 | E10,1 |
| Resync 35 | E1,2 | E2,2 | E3,2 | E4,2 | E5,2 | E6,2 | E7,2 | E8,2 | E9,2 | E10,2 |
| | E1,3 | E2,3 | E3,3 | E4,3 | E5,3 | E6,3 | E7,3 | E8,3 | E9,3 | E10,3 |
| Resync 39 | E1,14 | E2,14 | E3,14 | E4,14 | E5,14 | E6,14 | E7,14 | E8,14 | E9,14 | E10,14 |
| | E1,15 | E2,15 | E3,15 | E4,15 | E5,15 | E6,15 | E7,15 | E8,15 | E9,15 | E10,15 |
| | E1,16 | E2,16 | E3,16 | E4,16 | E5,16 | E6,16 | E7,16 | E8,16 | E9,16 | E10,16 |
| Resync 40 | D1025 | D1026 | D1027 | D1028 | D1029 | D1030 | D1031 | D1032 | D1033 | D1034 |
| | D1035 | D1036 | D1037 | D1038 | D1039 | D1040 | D1041 | D1042 | D1043 | D1044 |
| Resync 74 | D1021 | P2,4 | P3,1 | D2048 | P1,1 | P1,2 | P1,3 | P1,4 | P2,1 | P2,2 |
| | P2,3 | P2,4 | P3,1 | P3,2 | P3,3 | P3,4 | C1 | C2 | C3 | C4 |
| | E1,1 | E2,1 | E3,1 | E4,1 | E5,1 | E6,1 | E7,1 | E8,1 | E9,1 | E10,1 |
| Resync 75 | E1,2 | E2,2 | E3,2 | E4,2 | E5,2 | E6,2 | E7,2 | E8,2 | E9,2 | E10,2 |
| | E1,3 | E2,3 | E3,3 | E4,3 | E5,3 | E6,3 | E7,3 | E8,3 | E9,3 | E10,3 |
| Resync 79 | E1,14 | E2,14 | E3,14 | E4,14 | E5,14 | E6,14 | E7,14 | E8,14 | E9,14 | E10,14 |
| | E1,15 | E2,15 | E3,15 | E4,15 | E5,15 | E6,15 | E7,15 | E8,15 | E9,15 | E10,15 |
| | E1,16 | E2,16 | E3,16 | E4,16 | E5,16 | E6,16 | E7,16 | E8,16 | E9,16 | E10,16 |

SWITCHING SIGNAL

APPLIED MAGNETIC FIELD

TRANSITION REGION

LASER BEAM

DOMAIN

WIDTH

―――― SILVER ATOM SEPARATION REGION

------ SILVER COMPOUND ORIENTATION REGION

RECORDING AND REPRODUCTION DEVICE FOR A MAGNETO-OPTIC RECORDING MEDIUM CAPABLE OF RECORDING INFORMATION ACCORDING TO OPTICAL SUPER-RESOLUTION

FIELD OF THE INVENTION

The present invention relates to magneto-optic recording media and recording and reproduction devices therefor, and more specifically to a magneto-optic recording medium capable of recording information by optical super-resolution and a recording and reproduction device therefor.

BACKGROUND ART

Magneto-optic disks have been noted as a medium which is rewritable, has large recording capacity and is highly reliable, and they have been put to use as memories for computers and the like. However, as the amount of information is increased and devices are miniaturized, a recording/reproduction technology with higher density is increasingly demanded.

High-density recording/reproduction technology is constituted by device techniques and medium techniques. The former techniques include optical super-resolution for obtaining a condensation spot exceeding the diffraction limit of laser light, reduction in laser beam wavelength, and the like. The latter techniques include reduction of medium pitch, improvement of reproduction resolution by means of magnetic multilayered film, and the like. The technique for improvement of reproduction resolution by means of magnetic multilayered film employs the fact that the temperature within a laser spot is maximized around its center or presents a Gaussian distribution to selectively transfer the state of a recording layer to a reproduction layer and read the state of the reproduction layer, and at present there are three main techniques, i.e. FAD, RAD and CAD (Center Aperture Detection). According to these techniques, the front or rear side or the center of a laser spot can be masked to provide a substantial reproduction area that is smaller than the diameter of the laser spot. This results in an improved reproduction density.

Conventionally, a magneto-optic disk employed in optical super-resolution includes a substrate, a base layer formed on the substrate, a reproduction layer formed on the base layer, a recording layer formed on the reproduction layer, and a protection layer formed on the recording layer. A magneto-optic disk with such a structure typically has a recording capacity of approximately 5 Gbytes.

The FAD, RAD and CAD systems described above cannot provide a magneto-optic disk with sufficiently large recording capacity, since the laser beams radiated for recording cause enlargement of the recording area that exceeds the Curie temperature. The laser beams radiated for reproduction also result in enlargement of the reproduction area exceeding the Curie temperature and hence low carrier-noise (CN) ratio in reproduction.

DISCLOSURE OF THE INVENTION

A main object of the present invention is to provide a large-capacity magneto-optic recording medium capable of recording/reproduction, and a recording/reproduction device therefor.

According to one aspect of the present invention, a magneto-optic recording medium has a recording capacity of 5 to 20 Gbytes, preferably 8 to 20 Gbytes, or 6 to 10 Gbytes.

According to another aspect of the present invention, a magneto-optic recording medium includes a substrate, a base layer formed on the substrate, a reproduction layer formed on the base layer, a recording layer formed on the reproduction layer, a first protection layer formed on the recording layer, a heat emitting layer formed on the first protection layer, and a second protection layer formed on the heat emitting layer. Preferably the magneto-optic recording medium also includes an intermediate layer formed between the reproduction layer and the recording layer.

In the magneto-optic recording medium, the heat generated within the recording layer by laser beams can rapidly be diffused via the heat emitting layer to reduce enlargement of the area exceeding the Curie temperature. Thus, information can be recorded at higher density.

According to still another aspect of the present invention, a recording/reproduction device for a magneto-optic recording medium includes a magnetic unit which supplies magnetic field to the magneto-optic recording medium in response to a recording signal indicative of information to be recorded, an optical unit which radiates a laser beam to the magneto-optic recording medium, and a pulsing circuit which pulses a laser beam. Preferably the recording/reproduction device also includes a blocking unit which blocks the center of a laser beam in reproduction.

In the recording/reproduction device, a laser beam to be radiated to the magneto-optic recording medium can be pulsed and the center of the laser beam can preferably be blocked to magnetize a recording area of the magneto-optic recording medium before diffusion of the heat generated by the laser beam in the magneto-optic recording medium and thus reduce enlargement of a recording area exceeding the Curie temperature. Thus, information can be recorded at higher density.

The above and other objects, features, aspects and advantages of the present invention become more apparent from the following detailed description of the present invention with reference to the accompanying drawings.

BRIEF DESCRIPTION OF THE DRAWINGS

FIGS. 12A and 12B are waveform diagrams representing a recording magnetic field and a pulsed laser beam for the recording/reproduction device according to the first embodiment.

FIGS. 14A and 14B respectively show RAM-type and ROM-type sector formats, and FIG. 14C shows a specific format of the SM, VFO, AM and RS shown in FIGS. 14A and 14B.

FIG. 15 shows a sink format of a data field configuration.

THE BEST MODE FOR IMPLEMENTING THE INVENTION

The embodiments of the present invention will now be specifically described with reference to the drawings.

First Embodiment

Figure 1:
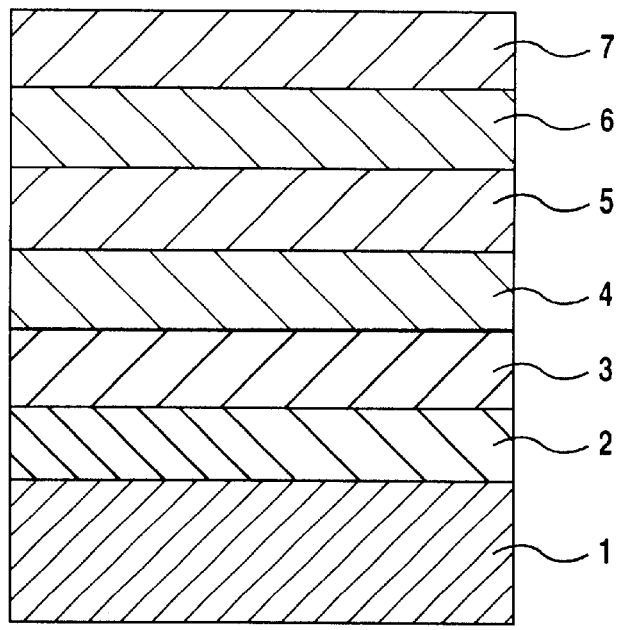
FIG. 1 is a cross section of an exemplary stack structure of a magneto-optic disk according to a first embodiment of the present invention.

Referring to FIG. 1, a magneto-optic disk according to the first embodiment of the present invention includes a substrate 1 formed of polycarbonate, a base layer 2 of SiN formed on substrate 1, a reproduction layer 3 of GdFeCo formed on base layer 2, a recording layer 4 of TbFeCo formed on reproduction layer 3, a protection layer 5 of SiN formed on recording layer 4, a heat emitting layer 6 of aluminum formed on protection layer 5, and a protection layer 7 of ultraviolet-hardened resin formed on heat emitting layer 6.

For the magneto-optic disk with such a configuration, optical super-resolution can be employed to record information at high density. More specifically, the information recorded in recording layer 4 is transferred to reproduction layer 3 through exchange coupling force in radiating a laser beam for reproduction and the information is reproduced therefrom. According to optical super-resolution, signals can be recorded/reproduced to/from a magneto-optic disk having a recording capacity of 5 to 20 Gbytes.

Base layer 2 has a film thickness of 700 Å (with a tolerance of ±10 Å). Reproduction layer 3 has a film thickness of 950 Å (with a tolerance of ±10 Å). Recording layer 4 has a film thickness of 500 Å (with a tolerance of ±10 Å). Protection layer 5 has a film thickness of 800 Å (with a tolerance of ±10 Å). Heat emitting layer 6 has a film thickness of 200 Å (with a tolerance of ±10 Å). Protection layer 7 has a film thickness of 20 μm (with a tolerance of ±1 μm).

The SiN forming base layer 2, the GdFeCo forming reproduction layer 3, the TbFeCo forming recording layer 4, the SiN forming protection layer 5, and the aluminum forming heat emitting layer 6 are deposited employing e.g. RF magnetron sputtering. The ultraviolet-hardened resin forming protection layer 7 is formed e.g. by spin coating.

For the magneto-optic disk, a laser beam enters substrate 1 and magneto-optic effect allow information to be read. Accordingly, base layer 2 deposited on substrate 1 is preferably formed of SiN having high transmissivity with respect to a laser beam of 600 to 700 nm in wavelength.

The magneto-optic disk has the highly heat-conductive, heat emitting layer 6 formed on reproduction layer 3 and recording layer 4 so that any heat generated by laser beam radiation within reproduction layer 3 and recording layer 4 can rapidly be diffused via heat emitting layer 6 to reduce unnecessary enlargement of a recording area that exceeds the Curie temperature and is thus recordable. Consequently the magneto-optic disk can record information at a higher density than conventional.

Figure 2:
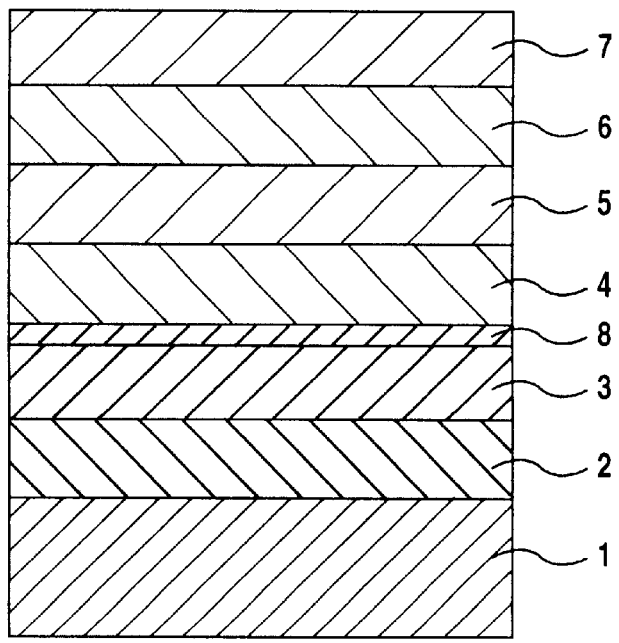
FIG. 2 is a cross section of another exemplary stack structure of the magneto-optic disk.

Heat emitting layer 6, formed of aluminum herein, may instead be formed of highly heat-conductive Ag, Cu, Au, W or Mg. As shown in FIG. 2, an intermediate layer 8 of TbFe may be formed between reproduction layer 3 and recording layer 4. Intermediate layer 8 has a film thickness of 200 Å (with a tolerance of ±50 Å). The TbFe forming intermediate layer 8 is deposited employing e.g. RF magnetron sputtering, as with the SiN forming base layer 2. A magneto-optic disk with such an intermediate layer 8 can record information at a still higher density.

Figure 3A:
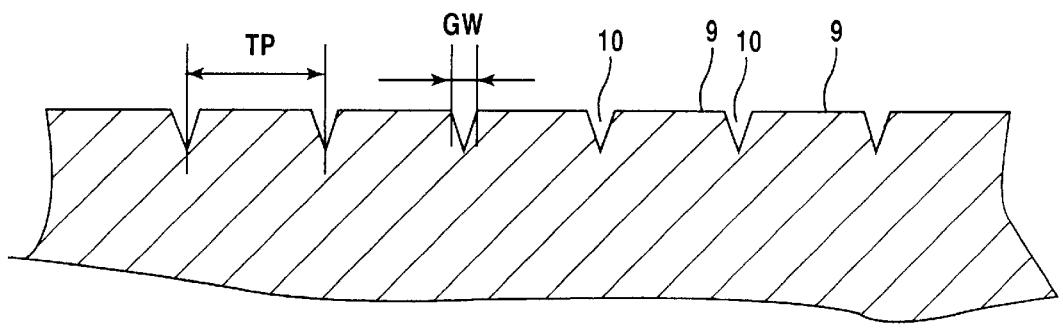
FIGS. 3A and 3B are cross sections of track structures of the magneto-optic disk shown in FIG. 1.
Figure 3B:
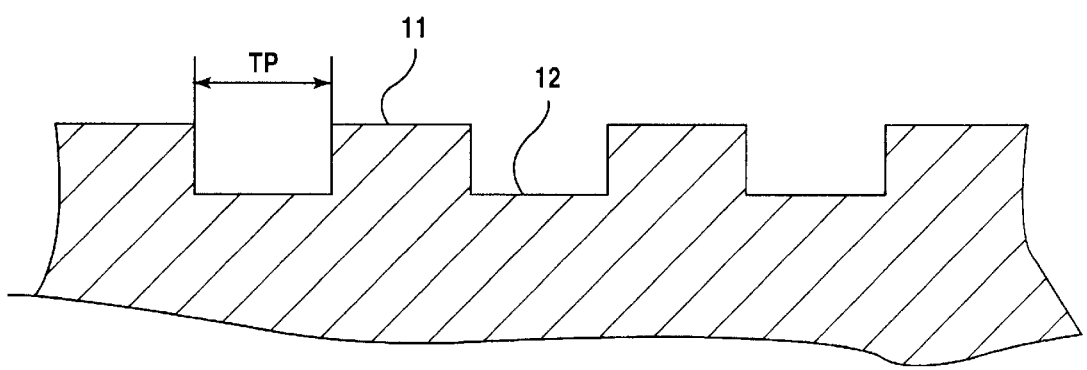

A track structure of the magneto-optic disk is shown in FIG. 3A or 3B. The magneto-optic disk shown in FIG. 3A has concentrically formed flat tracks 9 and guide grooves 10 formed between tracks 9. The magneto-optic disk shown in FIG. 3B has concentrically formed lands 11 and grooves 12. The magneto-optic disk having lands 11 and grooves 12 allows signals to be recorded at both the lands and the grooves. Thus the magneto-optic disk can obtain large recording capacity.

Figure 4:
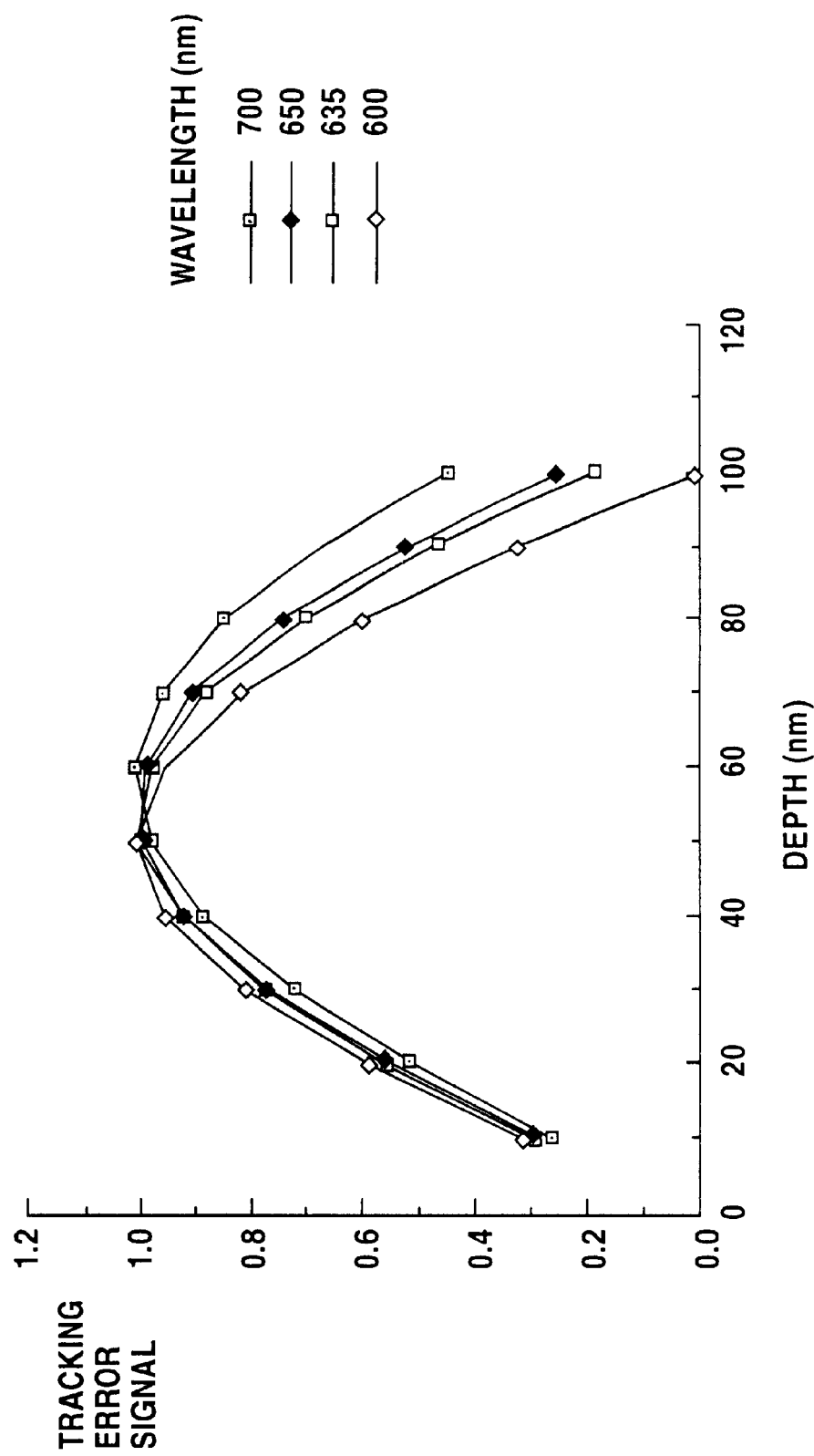
FIG. 4 is a graph of various normalized tracking error signals versus the depth of a guiding groove in the magneto-optic disk shown in FIG. 1 for various laser beam wavelengths.

In FIG. 3A, a track pitch TP is defined as the distance from the center of one guide groove 10 to the center of another guide groove 10 adjacent thereto. Track pitch TP is e.g. 0.4 to 0.7 μm. Guide groove 10 has a width of e.g. 0.12 to 0.21 μm. Guide groove 10 has a depth of e.g. 30 to 70 nm, preferably 40 to 60 nm. The depth of guide groove 10 is determined based on the FIG. 4 described later so that a normalized tracking error signal exceeds 0.8.

In FIG. 3B, land 11 and groove 12 have a same width. Track pitch TP is defined as the width of land 11 or groove 12. Track pitch TP is similar to that described above, i.e. 0.4 to 0.7 μm. Groove 12 has a depth (a level difference between land 11 and groove 12) of e.g. 30 to 70 nm, preferably 40 to 60 nm. The depth of groove 12 is determined based on FIG. 5 so that the CN ratio in reproduction is 30 to 43 dB and the cross talk in reproduction is less than −20 dB. For the magneto-optic disk shown in FIG. 3B, data are recorded at both land 11 and groove 12.

Figures 5, 6:
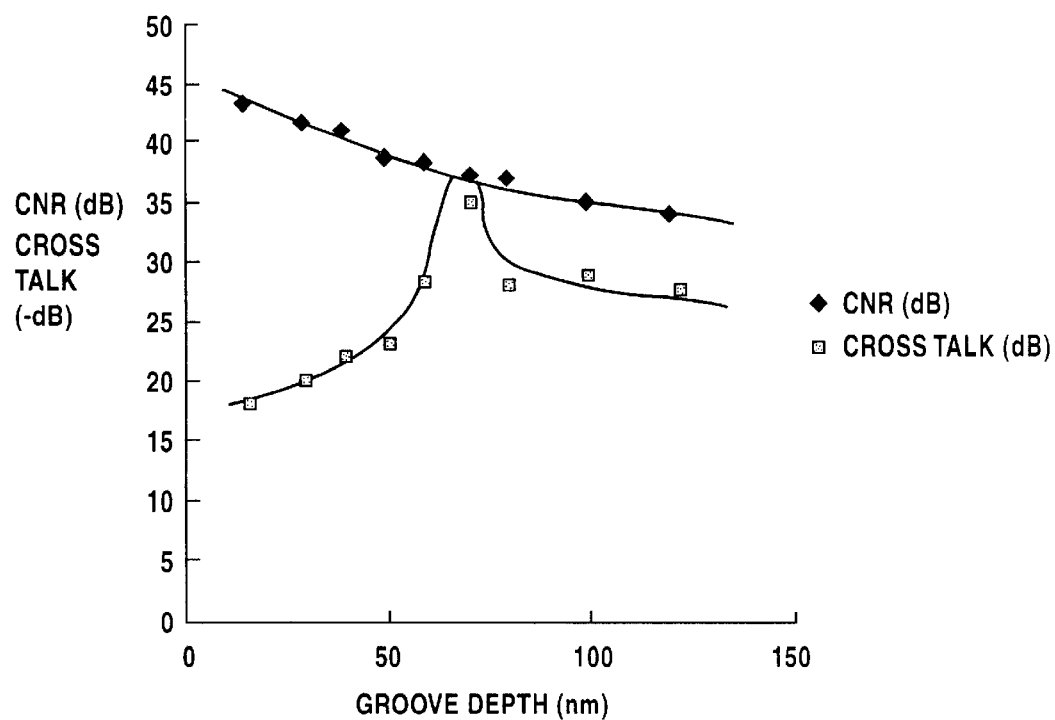
FIG. 5 is a graph of the CN ratio in reproduction and cross talk versus groove depth in the magneto-optic disk shown in FIG. 1.
FIG. 6 shows a data format when a track of the FIG. 1 magneto-optic disk is wobbled.

In both of FIGS. 3A and 3B, the minimum domain length is e.g. 0.25 to 0.45 μm. Preferably the tracks are wobbled. The wobble frequency is e.g. 20 to 100 kHz. FIG. 6 shows an exemplary data format for a wobble frequency of 75.6 kHz (=42 bits/sector×225 sectors/sec×8/bit). A bracketted numerical value in the figure indicates the number of bits.

Table 1 represents a relation between totaled recording capacity and the inner and outer radii of a data area for a magneto-optic disk having the structure described above.

TABLE 1

| TOTAL RECORDING CAPACITY (Gbyts) INNER RADIUS OF DATA AREA (mm) | OUTER RADIUS OF DATA AREA (mm) | | | | | | | | | | | |
|---|---|---|---|---|---|---|---|---|---|---|---|---|
| | 30 | 35 | 40 | 50 | 55 | 56 | 57 | 58 | 59 | 60 | 65 | 80 |
| 10 | 2.09 | 2.95 | 3.93 | 6.28 | 7.66 | 7.95 | 8.24 | 8.54 | 8.85 | 9.16 | 10.8 | 12.6 |
| 11 | 2.04 | 2.89 | 3.87 | 6.23 | 7.6 | 7.89 | 8.19 | 8.49 | 8.8 | 9.11 | 10.7 | 12.5 |
| 12 | 1.98 | 2.83 | 3.81 | 6.17 | 7.54 | 7.83 | 8.13 | 8.43 | 8.74 | 9.05 | 10.7 | 12.5 |
| 13 | 1.91 | 2.76 | 3.75 | 6.1 | 7.48 | 7.77 | 8.06 | 8.36 | 8.67 | 8.98 | 10.6 | 12.4 |
| 14 | 1.84 | 2.69 | 3.68 | 6.03 | 7.41 | 7.7 | 7.99 | 8.29 | 8.6 | 8.91 | 10.5 | 12.3 |
| 15 | 1.77 | 2.62 | 3.6 | 5.96 | 7.33 | 7.62 | 7.92 | 8.22 | 8.52 | 8.84 | 10.5 | 12.2 |
| 16 | 1.69 | 2.54 | 3.52 | 5.87 | 7.25 | 7.54 | 7.84 | 8.14 | 8.44 | 8.75 | 10.4 | 12.2 |
| 17 | 1.6 | 2.45 | 3.43 | 5.79 | 7.16 | 7.45 | 7.75 | 8.05 | 8.36 | 8.67 | 10.3 | 12.1 |
| 18 | 1.51 | 2.36 | 3.34 | 5.7 | 7.07 | 7.36 | 7.66 | 7.96 | 8.26 | 8.58 | 10.2 | 12 |
| 19 | 1.41 | 2.26 | 3.24 | 5.6 | 6.97 | 7.26 | 7.56 | 7.86 | 8.17 | 8.48 | 10.1 | 11.9 |
| 20 | 1.31 | 2.16 | 3.14 | 5.5 | 6.87 | 7.16 | 7.46 | 7.76 | 8.07 | 8.38 | 10 | 11.8 |
| 21 | 1.2 | 2.05 | 3.03 | 5.39 | 6.76 | 7.06 | 7.35 | 7.65 | 7.96 | 8.27 | 9.91 | 11.7 |
| 22 | 1.09 | 1.94 | 2.92 | 5.28 | 6.65 | 6.94 | 7.24 | 7.54 | 7.85 | 8.16 | 9.79 | 11.6 |
| 23 | 0.97 | 1.82 | 2.8 | 5.16 | 6.53 | 6.82 | 7.12 | 7.42 | 7.73 | 8.04 | 9.68 | 11.4 |
| 24 | 0.85 | 1.7 | 2.68 | 5.04 | 6.41 | 6.7 | 7 | 7.3 | 7.61 | 7.92 | 9.55 | 11.3 |
| 25 | 0.72 | 1.57 | 2.55 | 4.91 | 6.28 | 6.57 | 6.87 | 7.17 | 7.48 | 7.79 | 9.42 | 11.2 |
| 26 | 0.59 | 1.44 | 2.42 | 4.78 | 6.15 | 6.44 | 6.74 | 7.04 | 7.34 | 7.65 | 9.29 | 11.1 |
| 27 | 0.45 | 1.3 | 2.28 | 4.64 | 6.01 | 6.3 | 6.6 | 6.9 | 7.2 | 7.52 | 9.15 | 10.9 |
| 28 | 0.3 | 1.15 | 2.14 | 4.49 | 5.87 | 6.16 | 6.45 | 6.75 | 7.06 | 7.37 | 9.01 | 10.8 |
| 29 | 0.15 | 1.01 | 1.99 | 4.34 | 5.72 | 6.01 | 6.3 | 6.61 | 6.91 | 7.22 | 8.86 | 10.6 |
| 30 | 0 | 0.85 | 1.83 | 4.19 | 5.56 | 5.85 | 6.15 | 6.45 | 6.76 | 7.07 | 8.7 | 10.5 |

As can be seen from Table 1, a magneto-optic disk having a totaled recording capacity of 6 to 12 Gbytes only requires a data region with an inner radius of 10 to 30 mm and an outer radius of 50 to 70 mm. A data region referred to herein is an region provided with pits. For a magneto-optic disk with a diameter of 118 to 122 mm, a data region with an inner radius of 10 to 27 mm and an outer radius of 50 to 59 mm can provide the recording capacity of 6 to 10 Gbytes mentioned above. While it is assumed herein that the substrate thickness is 1.2 mm, it is not limited to 1.2 mm and may be e.g. 0.5 to 1.3 mm, preferably 0.7 to 1.3 mm. A magneto-optic disk may have a diameter of e.g. 60 to 150 mm. In the specification, a substrate thickness is defined as a distance from a signal reading surface to a recording surface.

Figure 7:
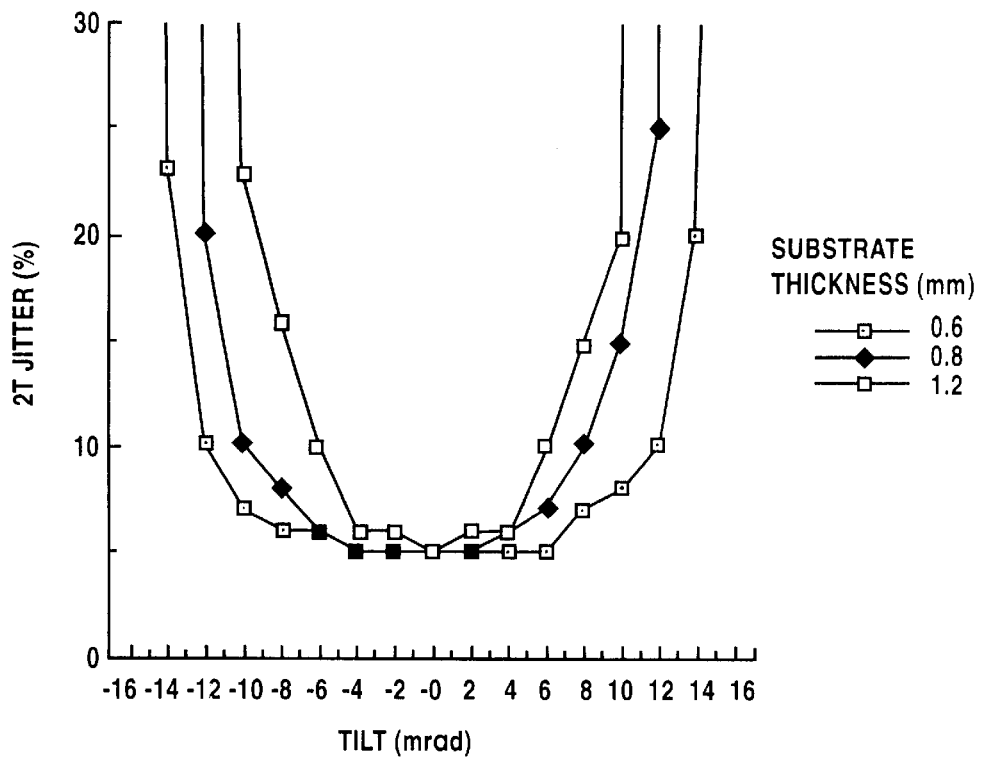
FIGS. 7 and 8 are graphs of jitter of the minimum domain length versus the tilt of the substrate of the magneto-optic disk shown in FIG. 1 for different substrate thicknesses.

FIG. 7 shows a dependency of jitter of the minimum domain length (2T) on the tilt of the substrate for various substrate thicknesses of 1.2 mm, 0.8 mm and 0.6 mm. It is understood that as substrate thickness is reduced, jitter of the minimum domain length is less affected by the tilt of the substrate.

Figure 8:
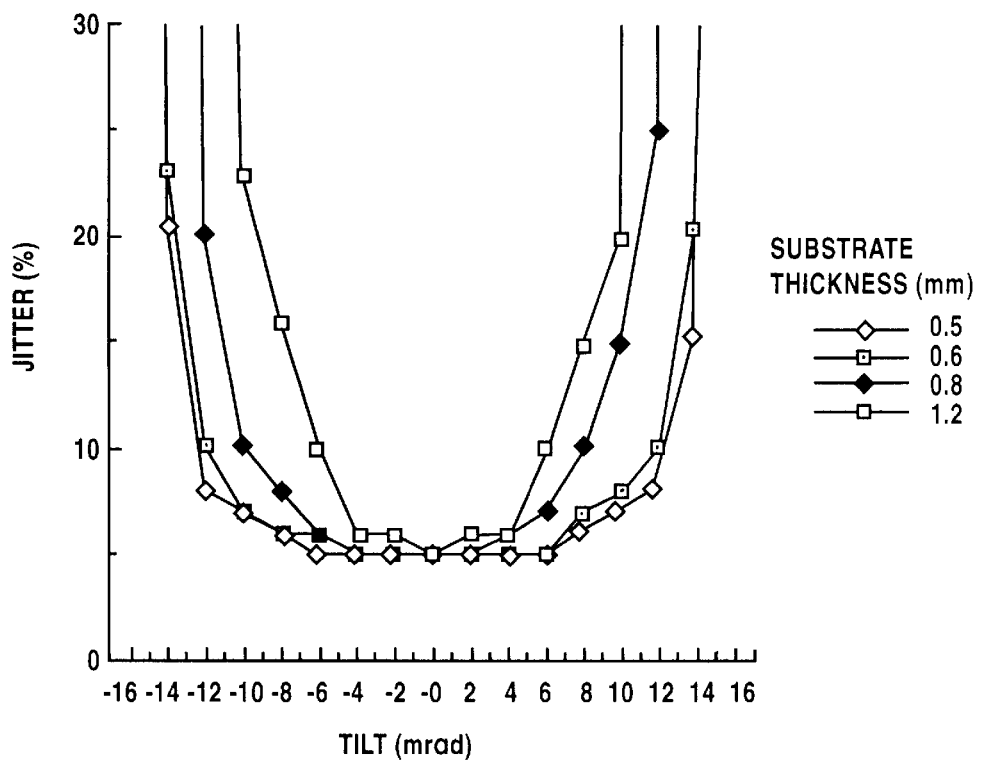

FIG. 8 adds a case for a substrate thickness of 0.5 mm. It is understood that for the substrate thickness of 0.5 mm, jitter of the minimum domain length is further less affected by the tilt of the substrate.

Figure 9:
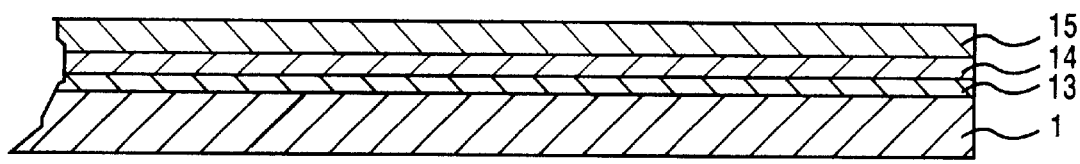
FIG. 9 is a cross section of a structure of a magneto-optic disk having a substrate thickness of less than 0.7 mm.

For a magneto-optic disk having a substrate of less than 0.7 mm in thickness, preferably an adhesive 14 is used to stick a reinforcement plate 15 on a magnetic layer 13 which includes reproduction layer 3, recording layer 4 and the like, as shown in FIG. 9.

Recording capacity is determined depending on track pitch and bit density, and bit density is determined depending on the minimum domain length. Tables 2 ad 3 represent a relation between recording capacity, and track pitch, the minimum domain length and bit density.

TABLE 2

| RECORDING CAPACITY (Mbyts) | | TRACK PITCH ($\mu$m) | | | | | | |
|---|---|---|---|---|---|---|---|---|
| MIN. DOMAIN LENGTH ($\mu$m) | BIT DENSITY ($\mu$m/bit) | 0.7 | 0.65 | 0.6 | 0.55 | 0.5 | 0.45 | 0.4 |
| 0.45 | 0.3375 | 3830 | 4124 | 4468 | 4874 | 5361 | 5957 | 6702 |
| 0.4 | 0.3 | 4308 | 4640 | 5026 | 5483 | 6032 | 6702 | 7540 |
| 0.39 | 0.2925 | 4419 | 4759 | 5155 | 5624 | 6186 | 6874 | 7733 |
| 0.38 | 0.285 | 4535 | 4884 | 5291 | 5772 | 6349 | 7055 | 7936 |
| 0.37 | 0.2775 | 4658 | 5016 | 5434 | 5928 | 6521 | 7245 | 8151 |
| 0.36 | 0.27 | 4787 | 5155 | 5585 | 6093 | 6702 | 7447 | 8377 |
| 0.35 | 0.2625 | 4924 | 5303 | 5744 | 6267 | 6893 | 7659 | 8617 |
| 0.34 | 0.255 | 5069 | 5459 | 5913 | 6451 | 7096 | 7885 | 8870 |
| 0.33 | 0.2475 | 5222 | 5624 | 6093 | 6646 | 7311 | 8123 | 9139 |
| 0.32 | 0.24 | 5385 | 5800 | 6283 | 6854 | 7540 | 8377 | 9425 |
| 0.31 | 0.2325 | 5559 | 5987 | 6486 | 7075 | 7783 | 8648 | 9729 |
| 0.3 | 0.225 | 5744 | 6186 | 6702 | 7311 | 8042 | 8936 | 10053 |
| 0.29 | 0.2175 | 5943 | 6400 | 6933 | 7563 | 8320 | 9244 | 10399 |
| 0.28 | 0.21 | 6155 | 6628 | 7181 | 7833 | 8617 | 9574 | 10771 |
| 0.27 | 0.2025 | 6383 | 6874 | 7447 | 8123 | 8936 | 9929 | 11170 |
| 0.26 | 0.195 | 6628 | 7138 | 7733 | 8436 | 9280 | 10311 | 11599 |
| 0.25 | 0.1875 | 6893 | 7424 | 8042 | 8773 | 9651 | 10723 | 12063 |

TABLE 3

| RECORDING CAPACITY (Mbyts) | | TRACK PITCH ($\mu$m) | | | | | | | |
|---|---|---|---|---|---|---|---|---|---|
| MIN. DOMAIN LENGTH ($\mu$m) | BIT DENSITY ($\mu$m/bit) | 0.8 | 0.7 | 0.65 | 0.6 | 0.55 | 0.5 | 0.45 | 0.4 |
| 0.45 | 0.3375 | 3351 | 3830 | 4124 | 4468 | 4874 | 5361 | 5957 | 6702 |
| 0.4 | 0.3 | 3770 | 4308 | 4640 | 5026 | 5483 | 6032 | 6702 | 7540 |
| 0.39 | 0.2925 | 3866 | 4419 | 4759 | 5155 | 5624 | 6186 | 6874 | 7733 |
| 0.38 | 0.285 | 3968 | 4535 | 4884 | 5291 | 5772 | 6349 | 7055 | 7936 |
| 0.37 | 0.2775 | 4075 | 4658 | 5016 | 5434 | 5928 | 6521 | 7245 | 8151 |
| 0.36 | 0.27 | 4189 | 4787 | 5155 | 5585 | 6093 | 6702 | 7447 | 8377 |
| 0.35 | 0.2625 | 4308 | 4924 | 5303 | 5744 | 6267 | 6893 | 7659 | 8617 |
| 0.34 | 0.255 | 4435 | 5069 | 5459 | 5913 | 6451 | 7096 | 7885 | 8870 |
| 0.33 | 0.2475 | 4569 | 5222 | 5624 | 6093 | 6646 | 7311 | 8123 | 9139 |
| 0.32 | 0.24 | 4712 | 5385 | 5800 | 6283 | 6854 | 7540 | 8377 | 9425 |
| 0.31 | 0.2325 | 4864 | 5559 | 5987 | 6486 | 7075 | 7783 | 8648 | 9729 |
| 0.3 | 0.225 | 5026 | 5744 | 6186 | 6702 | 7311 | 8042 | 8936 | 10053 |
| 0.29 | 0.2175 | 5200 | 5943 | 6400 | 6933 | 7563 | 8320 | 9244 | 10399 |
| 0.28 | 0.21 | 5385 | 6155 | 6628 | 7181 | 7833 | 8617 | 9574 | 10771 |
| 0.27 | 0.2025 | 5585 | 6383 | 6874 | 7447 | 8123 | 8936 | 9929 | 11170 |
| 0.26 | 0.195 | 5800 | 6628 | 7138 | 7733 | 8436 | 9280 | 10311 | 11599 |
| 0.25 | 0.1875 | 6032 | 6893 | 7424 | 8042 | 8773 | 9651 | 10723 | 12063 |
| 0.24 | 0.18 | 6283 | 7181 | 7733 | 8377 | 9139 | 10053 | 11170 | 12566 |
| 0.23 | 0.1725 | 6556 | 7493 | 8069 | 8742 | 9536 | 10490 | 11655 | 13112 |
| 0.21 | 0.1575 | 7181 | 8206 | 8838 | 9574 | 10444 | 11489 | 12765 | 14361 |
| 0.2 | 0.15 | 7540 | 8617 | 9280 | 10053 | 10967 | 12063 | 13404 | 15079 |

As can be seen from Tables 2 and 3, the minimum domain length is e.g. 0.20 to 0.45 μm, preferably 0.25 to 0.45 μm. For recording in the 1–7 system, the bit density is e.g. 0.15 to 0.3375 μm/bit, preferably 0.1875 to 0.3375 μm/bit. The track pitch is 0.4 to 0.8 μm, preferably 0.4 to 0.7 μm. When track pitch and bit density vary within the above ranges, recording capacity varies within a range from 3.35 to 15.1 Gbytes. A magneto-optic disk according to the present embodiment has a recording capacity of e.g. 5 to 12 Gbytes, preferably 6 to 10 Gbytes.

Figure 10:
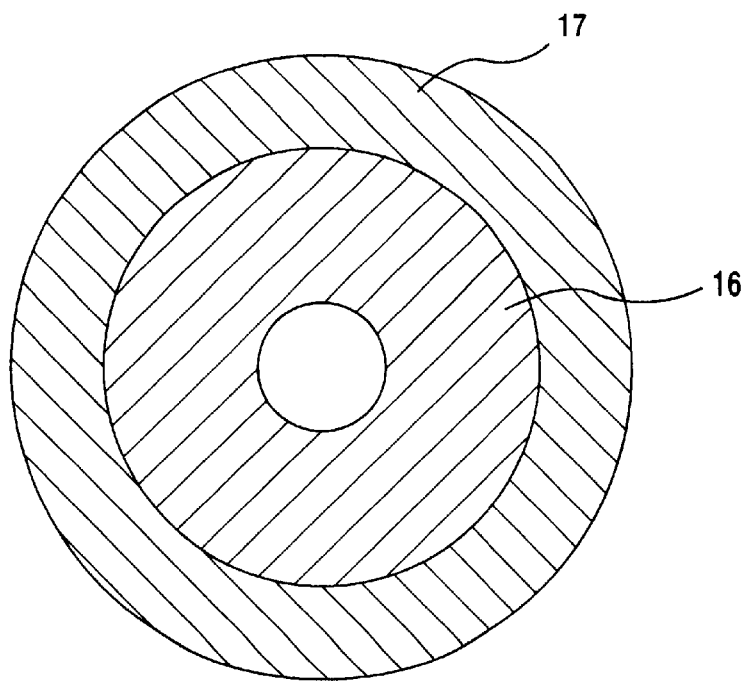
FIG. 10 is a plan view of the FIG. 1 magneto-optic disk.

The magneto-optic disk preferably has a readable and writable RAM portion 16 arranged at the center of the disk, and a read-only ROM portion 17 arranged at the perimeter of the disk, as shown in FIG. 10. For the magneto-optic disk with such a structure, the pit depth, track pitch, and bit density within ROM portion 17 are the same as those within RAM portion 16. A pit width is less than e.g. 0.2 μm. The pit depth, track pitch, and bit density within ROM portion 17 may be different from those within RAM portion 16 and may be 1.1 to 1.7 times larger than those within RAM portion 16.

An optical head in a recording/reproduction device for a magneto-optic disk according to the present embodiment will now be described with reference to FIG. 11.

A laser beam emanating from a semiconductor laser 18 enters a collimator lens 21 via halfmirrors 19 and 20. The laser beam collimated by collimator lens 21 enters an objective lens 22. The laser beam incident on objective lens 22 is collected by objective lens 22 and transmitted through a transparent substrate 23 of the magneto-optic disk that is formed of polycarbonate. The transmitted laser beam is focused into a spot on a recording surface 23a of substrate 23. The laser beam reflected from recording surface 23a returns via objective lens 22 and collimator lens 21 to halfmirrors 20 and 19. The returned laser beam is reflected by halfmirror 20 in a direction deviating from its incident direction by 90°. The reflected beam is separated by a polarizing beam splitter 24 in two directions and the separated beams are detected by photodetectors 25a and 25b, respectively. The two signals output from photodetectors 25a and 25b are provided to a differential amplifier 26 to produce a reproduced signal RF.

Meanwhile, the laser beam which is returned to halfmirror 19 is reflected by halfmirror 19 in a direction deviating from its incident direction by 90°. The reflected laser beam is condensed by a group of condensers 27 and then detected by a quarter photodetector 28. Detector 28 outputs a focus error signal FE and a tracking error signal TE respectively used for focusing servo and tracking servo.

The optical head adopts push-pull tracking servo control and the tracking error signal has a magnitude of 0.1 to 0.4. the push-pull herein includes differential push-pull other than the normal push-pull.

A recording system for a recording/reproduction device according to the present embodiment will now be described.

In place of the conventional recording system employing a continuously radiated laser beam, the recording/reproduction device employs a pulse modulation system which pulses a laser beam synchronously with the recording magnetic field shown in FIG. 12A, as shown in FIG. 12B. Duty ratio which defines modulation degree is determined depending on the ratio of a time t during which semiconductor laser 18 is turned on to a time T during which semiconductor laser 18 is turned off, i.e. t/T A phase difference δ is defined as the time difference between a recording magnetic field and a pulsed laser beam.

Figure 13:
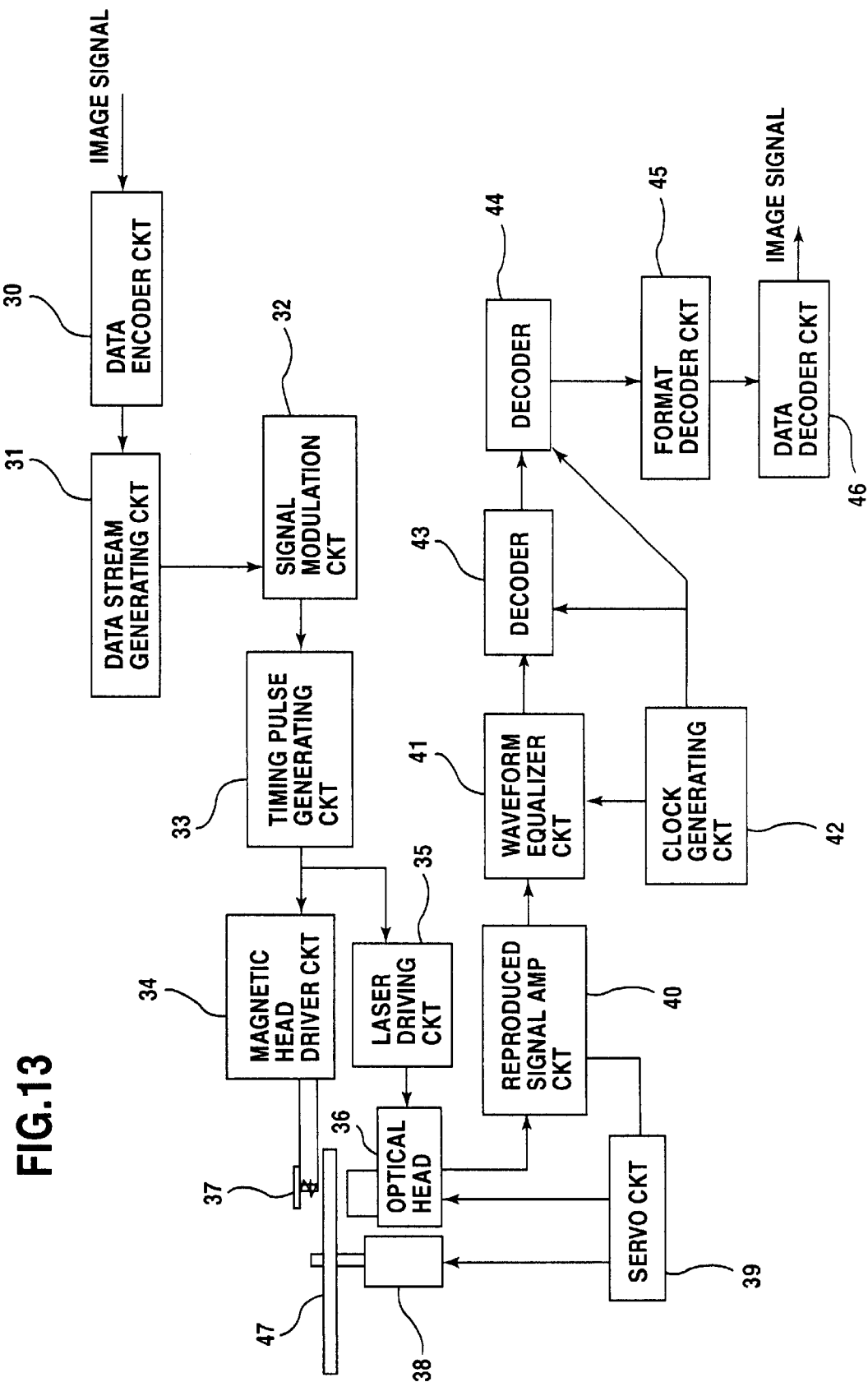
FIG. 13 is a block diagram showing a configuration of the recording/reproduction device according to the first embodiment.

Referring to FIG. 13, the recording/reproduction device includes a data encoder circuit 30, a data stream generating circuit 31, a signal modulation circuit 32, a timing pulse generating circuit 33, a magnetic head driver circuit 34, a laser driver circuit 35, an optical head 36, a magnetic head 37, a spindle motor 38, a servo circuit 39, a reproduced signal amplifying circuit 40, a waveform equalizer circuit 41, a clock generating circuit 42, decoders 43 and 44, a format decoder circuit 45, and a data decoder circuit 46.

An image signal indicative of information to be recorded is provided to data encoder circuit 30 which compresses the image data in the MPEG system. Then, data stream generating circuit 31 adds management information, such as reproduction time, elapse time, address, and error correction code, to the compressed signal. Exemplary data format of a signal to which the management information is added are shown in FIGS. 14A–14C and 15. FIG. 14A shows a RAM-type data format and FIG. 14B shows a ROM-type data format, wherein SM represents sector mark, VFO represents variable frequency oscillator, AM represents address mark, ID represents identifier, PA represents postamble, SC represents subcode, SYNC represents synchronization pattern, Data represents user data, Resync represents re-synchronization pattern, CLC represents cyclic redundant code, ECC represents error correction code, and BUFFER represents electrical and mechanical tolerance. A bracketed numerical value represents the number of bytes. FIG. 14C indicates specific values of the SM, VFO, AM and RS indicated in FIGS. 14A and 14B.

In FIG. 15, the totaled number of bytes for one sector is 2688 bytes configured of a header field of 70 bytes, a data field of 2560 bytes, and a buffer field of 58 bytes. The 2560-byte data field is configured of a Resync field of 160 bytes, a data field of 2048 bytes, a DMP field of 24 bytes, a CRC field of 8 bytes, and an ECC field of 320 bytes.

The various pieces of management information described above are input to the ID portions shown in FIGS. 14A and 14B, and a sink shown in FIG. 15 is added in front of each data.

Referring again to FIG. 13, the data to which the management information is added is sent to and thus modulated by signal modulation circuit 32 in the 1–7RLL system. After the modulation in the 1–7RLL system, the data is sent to timing pulse generating circuit 33 which changes the data to a pulse signal having a predetermined duty ratio and also sets a predetermined phase difference. Then the pulse signal is sent to magnetic head driver circuit 34 and laser driver circuit 35. Laser driver circuit 35 responds to the sent pulse signal to turn on/off semiconductor laser 18 in optical head 36. Thus a pulsed laser beam is radiated onto recording surface of magneto-optic disk 47. Meanwhile, magnetic head driver circuit 34 responds to an applied recording signal to drive magnetic head 37 and the recording signal is thus recorded on magneto-optic disk 47.

As shown in FIGS. 12A and 12B, a pulsed laser beam herein is delayed from a recording magnetic field by 0 to 60 ns. The pulsed laser beam has a duty ratio of 20 to 60%. It should be noted that the information to be recorded is not limited to the image signal described above and may be audio signal, data signal and the like.

For the recording/reproduction device according to the present embodiment, one recording signal is recorded while semiconductor laser 18 is turned on twice, as shown in FIGS. 12A and 12B. Thus, an equally heated area in recording layer 4 is smaller than that for a conventional system which employs a continuously radiated laser beam with constant intensity while a signal is recorded. More specifically, the conventional system employing a continuously radiated laser beam causes the heat generated in recording layer 4 to be diffused, whereas the present system employing a pulsed laser beam reduces diffusion of the heat generated in recording layer 4. The heat emitting layer 6 described above also contributes to such a heat diffusion reducing effect.

Thus the present embodiment can provide heat emitting layer 6 formed on recording layer 4 and also provide pulsed laser beam to provide an equally heated area smaller than conventional. This allows recording at a density higher than conventional, with a recording domain width of 0.45 to 0.55 μm or 0.35 to 0.65 μm. Recording on a magneto-optic disk according to the present embodiment is provided under the following conditions: a laser beam wavelength of 600 to 700 nm, a numerical aperture NA of objective lens 22 of 0.50 to 0.65, a recording linear velocity of 1.2 to 3.6 m/sec, preferably 1.5 to 2.4 m/sec, and a recording frequency of 2.0 MHz. A preferable recording magnetic field is ±200 Oe, a preferable write power is 8 to 15 mW and a preferable duty ratio of pulsed laser beam is 40%.

While the recording linear velocity mentioned above is of real time, it is not limited thereto and may be a linear velocity twice to 12 times greater than that linear velocity. The wavelength of laser beam is preferably 630 to 690 nm, more preferably 630 to 660 nm. This also applies to the embodiments described hereinafter. The diameter of a laser beam spot is determined depending on numerical aperture NA of objective lens 22 and the wavelength of the laser beam. In this specification, the diameter of a spot is defined as the diameter thereof in a direction in which a track runs.

Table 4 represents a relation between the diameter of a laser beam spot, and numerical aperture NA of objective lens 22 and the wavelength of the laser beam.

TABLE 4

| DIAMETER OF SPOT (μm) | NA OF LENSE | | | | | | | | | | |
|---|---|---|---|---|---|---|---|---|---|---|---|
| WAVELENGTH OF LASER (nm) | 0.4 | 0.45 | 0.5 | 0.51 | 0.52 | 0.53 | 0.55 | 0.6 | 0.65 | 0.7 | 0.9 |
| 780 | 1.6 | 1.42 | 1.28 | 1.25 | 1.23 | 1.21 | 1.16 | 1.07 | 0.98 | 0.91 | 0.71 |
| 690 | 1.41 | 1.26 | 1.13 | 1.11 | 1.09 | 1.07 | 1.03 | 0.94 | 0.87 | 0.81 | 0.63 |
| 680 | 1.39 | 1.24 | 1.12 | 1.09 | 1.07 | 1.05 | 1.01 | 0.93 | 0.86 | 0.8 | 0.62 |
| 670 | 1.37 | 1.22 | 1.1 | 1.08 | 1.06 | 1.04 | 1 | 0.92 | 0.85 | 0.78 | 0.61 |
| 660 | 1.35 | 1.2 | 1.08 | 1.06 | 1.04 | 1.02 | 0.98 | 0.9 | 0.83 | 0.77 | 0.6 |
| 650 | 1.33 | 1.18 | 1.07 | 1.05 | 1.03 | 1.01 | 0.97 | 0.89 | 0.82 | 0.76 | 0.59 |
| 640 | 1.31 | 1.17 | 1.05 | 1.03 | 1.01 | 0.99 | 0.95 | 0.87 | 0.81 | 0.75 | 0.58 |
| 630 | 1.29 | 1.15 | 1.03 | 1.01 | 0.99 | 0.97 | 0.94 | 0.86 | 0.79 | 0.74 | 0.57 |
| 620 | 1.27 | 1.13 | 1.02 | 1 | 0.98 | 0.96 | 0.92 | 0.85 | 0.78 | 0.73 | 0.56 |
| 610 | 1.25 | 1.11 | 1 | 0.98 | 0.96 | 0.94 | 0.91 | 0.83 | 0.77 | 0.71 | 0.56 |
| 600 | 1.23 | 1.09 | 0.98 | 0.96 | 0.95 | 0.93 | 0.89 | 0.82 | 0.76 | 0.7 | 0.55 |
| 550 | 1.13 | 1 | 0.9 | 0.88 | 0.87 | 0.85 | 0.82 | 0.75 | 0.69 | 0.64 | 0.5 |
| 500 | 1.03 | 0.91 | 0.82 | 0.8 | 0.79 | 0.77 | 0.75 | 0.68 | 0.63 | 0.59 | 0.46 |
| 450 | 0.92 | 0.82 | 0.74 | 0.72 | 0.71 | 0.7 | 0.67 | 0.62 | 0.57 | 0.53 | 0.41 |
| 400 | 0.82 | 0.73 | 0.66 | 0.64 | 0.63 | 0.62 | 0.6 | 0.55 | 0.5 | 0.47 | 0.36 |
| 350 | 0.72 | 0.64 | 0.57 | 0.56 | 0.55 | 0.54 | 0.52 | 0.48 | 0.44 | 0.41 | 0.32 |

The diameter of a laser beam spot determined from the above range of laser beam wavelength and the above range of numerical aperture NA of objective lens 22 is 0.76 to 1.09 μm. Any diameter of a laser beam spot that falls within this range is preferably used for the recording/reproduction device according to the present embodiment.

The data transfer rate in recording is detrained depending on the recording linear velocity and the bit density. Tables 5 and 6 represent relations between data transfer rate, and bit density and recording linear velocity.

TABLE 5

| DATA TRANSFER RATE (Mbps) | BIT DENSITY (μm/bit) | | | | | | | | | |
|---|---|---|---|---|---|---|---|---|---|---|
| LINEAR VELOCITY (m/S) | 0.33 | 0.3 | 0.27 | 0.24 | 0.22 | 0.2 | 0.18 | 0.16 | 0.15 | 0.14 |
| 1 | 2.42 | 2.67 | 2.96 | 3.33 | 3.64 | 4 | 4.44 | 5 | 5.333 | 5.71 |
| 1.2 | 2.91 | 3.2 | 3.56 | 4 | 4.36 | 4.8 | 5.33 | 6 | 6.4 | 6.86 |
| 1.4 | 3.39 | 3.73 | 4.15 | 4.67 | 5.09 | 5.6 | 6.22 | 7 | 7.467 | 8 |
| 1.5 | 3.64 | 4 | 4.44 | 5 | 5.45 | 6 | 6.67 | 7.5 | 8 | 8.57 |
| 1.6 | 3.88 | 4.27 | 4.74 | 5.33 | 5.82 | 6.4 | 7.11 | 8 | 8.533 | 9.14 |
| 1.7 | 4.12 | 4.53 | 5.04 | 5.67 | 6.18 | 6.8 | 7.56 | 8.5 | 9.067 | 9.71 |
| 1.8 | 4.36 | 4.8 | 5.33 | 6 | 6.55 | 7.2 | 8 | 9 | 9.6 | 10.3 |
| 1.9 | 4.61 | 5.07 | 5.63 | 6.33 | 6.91 | 7.6 | 8.44 | 9.5 | 10.13 | 10.9 |
| 2 | 4.85 | 5.33 | 5.93 | 6.67 | 7.27 | 8 | 8.89 | 10 | 10.67 | 11.4 |
| 2.2 | 5.33 | 5.87 | 6.52 | 7.33 | 8 | 8.8 | 9.78 | 11 | 11.73 | 12.6 |
| 2.4 | 5.82 | 6.4 | 7.11 | 8 | 8.73 | 9.6 | 10.7 | 12 | 12.8 | 13.7 |
| 2.6 | 6.3 | 6.93 | 7.7 | 8.67 | 9.45 | 10.4 | 11.6 | 13 | 13.87 | 14.9 |
| 2.8 | 6.79 | 7.47 | 8.3 | 9.33 | 10.2 | 11.2 | 12.4 | 14 | 14.93 | 16 |
| 3 | 7.27 | 8 | 8.89 | 10 | 10.9 | 12 | 13.3 | 15 | 16 | 17.1 |
| 3.5 | 8.48 | 9.33 | 10.4 | 11.7 | 12.7 | 14 | 15.6 | 17.5 | 18.67 | 20 |
| 4 | 9.7 | 10.7 | 11.9 | 13.3 | 14.5 | 16 | 17.8 | 20 | 21.33 | 22.9 |
| 4.5 | 10.9 | 12 | 13.3 | 15 | 16.4 | 18 | 20 | 22.5 | 24 | 25.7 |
| 5 | 12.1 | 13.3 | 14.8 | 16.7 | 18.2 | 20 | 22.2 | 25 | 26.67 | 28.6 |
| 5.5 | 13.3 | 14.7 | 16.3 | 18.3 | 20 | 22 | 24.4 | 27.5 | 29.33 | 31.4 |
| 6 | 14.5 | 16 | 17.8 | 20 | 21.8 | 24 | 26.7 | 30 | 32 | 34.3 |

TABLE 6

| DATA TRANSFER RATE (Mbps) | BIT DENSITY (μm/bit) | | | | | | | | | |
|---|---|---|---|---|---|---|---|---|---|---|
| LINEAR VELOCITY (m/S) | 0.33 | 0.3 | 0.27 | 0.24 | 0.22 | 0.2 | 0.18 | 0.16 | 0.15 | 0.14 |
| 1 | 2.42 | 2.67 | 2.96 | 3.33 | 3.64 | 4 | 4.44 | 5 | 5.333 | 5.71 |
| 1.2 | 2.91 | 3.2 | 3.56 | 4 | 4.36 | 4.8 | 5.33 | 6 | 6.4 | 6.86 |
| 1.4 | 3.39 | 3.73 | 4.15 | 4.67 | 5.09 | 5.6 | 6.22 | 7 | 7.467 | 8 |
| 1.5 | 3.64 | 4 | 4.44 | 5 | 5.45 | 6 | 6.67 | 7.5 | 8 | 8.57 |
| 1.6 | 3.88 | 4.27 | 4.74 | 5.33 | 5.82 | 6.4 | 7.11 | 8 | 8.533 | 9.14 |
| 1.7 | 4.12 | 4.53 | 5.04 | 5.67 | 6.18 | 6.8 | 7.56 | 8.5 | 9.067 | 9.71 |
| 1.8 | 4.36 | 4.8 | 5.33 | 6 | 6.55 | 7.2 | 8 | 9 | 9.6 | 10.3 |
| 1.9 | 4.61 | 5.07 | 5.63 | 6.33 | 6.91 | 7.6 | 8.44 | 9.5 | 10.13 | 10.9 |
| 2 | 4.85 | 5.33 | 5.93 | 6.67 | 7.27 | 8 | 8.89 | 10 | 10.67 | 11.4 |
| 2.2 | 5.33 | 5.87 | 6.52 | 7.33 | 8 | 8.8 | 9.78 | 11 | 11.73 | 12.6 |
| 2.4 | 5.82 | 6.4 | 7.11 | 8 | 8.73 | 9.6 | 10.7 | 12 | 12.8 | 13.7 |
| 2.6 | 6.3 | 6.93 | 7.7 | 8.67 | 9.45 | 10.4 | 11.6 | 13 | 13.87 | 14.9 |
| 2.8 | 6.79 | 7.47 | 8.3 | 9.33 | 10.2 | 11.2 | 12.4 | 14 | 14.93 | 16 |
| 3 | 7.27 | 8 | 8.89 | 10 | 10.9 | 12 | 13.3 | 15 | 16 | 17.1 |
| 3.5 | 8.48 | 9.33 | 10.4 | 11.7 | 12.7 | 14 | 15.6 | 17.5 | 18.67 | 20 |
| 4 | 9.7 | 10.7 | 11.9 | 13.3 | 14.5 | 16 | 17.8 | 20 | 21.33 | 22.9 |
| 4.5 | 10.9 | 12 | 13.3 | 15 | 16.4 | 18 | 20 | 22.5 | 24 | 25.7 |
| 5 | 12.1 | 13.3 | 14.8 | 16.7 | 18.2 | 20 | 22.2 | 25 | 26.67 | 28.6 |
| 5.5 | 13.3 | 14.7 | 16.3 | 18.3 | 20 | 22 | 24.4 | 27.5 | 29.33 | 31.4 |
| 6 | 14.5 | 16 | 17.8 | 20 | 21.8 | 24 | 26.7 | 30 | 32 | 34.3 |

In the present embodiment, bit density is 0.15 to 0.33 μm/bit, preferably 0.2 to 0.3 μm/bit. Recording linear velocity is 1.2 to 3.6 m/sec, preferably 1.5 to 2.4 m/sec. Thus, data transfer rate is 2.9 to 19 Mbps, preferably 3.7 to 10 Mbps.

Table 7 represents a relation between disk capacity, and recording time and data transfer rate.

TABLE 7

| RECORDING CAPACITY (Mbyts) | RECORDING TIME (min) | | | | | | | |
|---|---|---|---|---|---|---|---|---|
| DATA TRANSFER RATE (Mbps) | 30 | 60 | 90 | 120 | 135 | 150 | 165 | 180 |
| 1 | 225 | 450 | 675 | 900 | 1013 | 1125 | 1238 | 1350 |
| 1.4 | 315 | 630 | 945 | 1260 | 1418 | 1575 | 1733 | 1890 |
| 2 | 450 | 900 | 1350 | 1800 | 2025 | 2250 | 2475 | 2700 |
| 2.5 | 563 | 1125 | 1688 | 2250 | 2531 | 2813 | 3094 | 3375 |
| 3 | 675 | 1350 | 2025 | 2700 | 3038 | 3375 | 3713 | 4050 |
| 3.5 | 788 | 1575 | 2363 | 3150 | 3544 | 3938 | 4331 | 4725 |
| 4 | 900 | 1800 | 2700 | 3600 | 4050 | 4500 | 4950 | 5400 |
| 4.5 | 1013 | 2025 | 3038 | 4050 | 4556 | 5063 | 5569 | 6075 |
| 5 | 1125 | 2250 | 3375 | 4500 | 5063 | 5625 | 6188 | 6750 |
| 5.5 | 1238 | 2475 | 3713 | 4950 | 5569 | 6188 | 6806 | 7425 |
| 6 | 1350 | 2700 | 4050 | 5400 | 6075 | 6750 | 7425 | 8100 |
| 6.5 | 1463 | 2925 | 4388 | 5850 | 6581 | 7313 | 8044 | 8775 |
| 7 | 1575 | 3150 | 4725 | 6300 | 7088 | 7875 | 8663 | 9450 |
| 7.5 | 1688 | 3375 | 5063 | 6750 | 7594 | 8438 | 9281 | 10125 |
| 8 | 1800 | 3600 | 5400 | 7200 | 8100 | 9000 | 9900 | 10800 |
| 8.5 | 1913 | 3825 | 5738 | 7650 | 8606 | 9563 | 10519 | 11475 |
| 9 | 2025 | 4050 | 6075 | 8100 | 9113 | 10125 | 11138 | 12150 |
| 9.5 | 2138 | 4275 | 6413 | 8550 | 9619 | 10688 | 11756 | 12825 |
| 10 | 2250 | 4500 | 6750 | 9000 | 10125 | 11250 | 12375 | 13500 |

For a data transfer rate of 3.7 to 10 Mbps, a magneto-optic disk with a recording capacity of 6 to 10 Gbytes allows recording for 90 to 180 minutes.

Table 8 represents a relation between totaled recording capacity, and recording time and data transfer rate.

TABLE 8

| TOTAL RECORDING CAPACITY (Gbyts) | TIME (min) | | | | | | | | | |
|---|---|---|---|---|---|---|---|---|---|---|
| DATA TRANSFER RATE (Mbps) | 30 | 60 | 90 | 120 | 135 | 150 | 165 | 180 | 360 | 480 |
| 1 | 0.23 | 0.45 | 0.68 | 0.9 | 1.01 | 1.13 | 1.24 | 1.35 | 2.7 | 3.6 |
| 1.4 | 0.32 | 0.63 | 0.95 | 1.26 | 1.42 | 1.58 | 1.73 | 1.89 | 3.78 | 5.04 |
| 2 | 0.45 | 0.9 | 1.35 | 1.8 | 2.03 | 2.25 | 2.48 | 2.7 | 5.4 | 7.2 |
| 2.5 | 0.56 | 1.125 | 1.69 | 2.25 | 2.53 | 2.81 | 3.09 | 3.38 | 6.75 | 9 |
| 3 | 0.68 | 1.35 | 2.03 | 2.7 | 3.04 | 3.38 | 3.71 | 4.05 | 8.1 | 10.8 |
| 3.5 | 0.79 | 1.575 | 2.36 | 3.15 | 3.54 | 3.94 | 4.33 | 4.73 | 9.45 | 12.6 |
| 4 | 0.9 | 1.8 | 2.7 | 3.6 | 4.05 | 4.5 | 4.95 | 5.4 | 10.8 | 14.4 |
| 4.5 | 1.01 | 2.025 | 3.04 | 4.05 | 4.56 | 5.06 | 5.57 | 6.08 | 12.2 | 16.2 |
| 5 | 1.13 | 2.25 | 3.38 | 4.5 | 5.06 | 5.63 | 6.19 | 6.75 | 13.5 | 18 |
| 5.5 | 1.24 | 2.475 | 3.71 | 4.95 | 5.57 | 6.19 | 6.81 | 7.43 | 14.9 | 19.8 |
| 6 | 1.35 | 2.7 | 4.05 | 5.4 | 6.08 | 6.75 | 7.43 | 8.1 | 16.2 | 21.6 |
| 6.5 | 1.46 | 2.925 | 4.39 | 5.85 | 6.58 | 7.31 | 8.04 | 8.78 | 17.6 | 23.4 |
| 7 | 1.58 | 3.15 | 4.73 | 6.3 | 7.09 | 7.88 | 8.66 | 9.45 | 18.9 | 25.2 |
| 7.5 | 1.69 | 3.375 | 5.06 | 6.75 | 7.59 | 8.44 | 9.28 | 10.1 | 20.3 | 27 |
| 8 | 1.8 | 3.6 | 5.4 | 7.2 | 8.1 | 9 | 9.9 | 10.8 | 21.6 | 28.8 |
| 8.5 | 1.91 | 3.825 | 5.74 | 7.65 | 8.61 | 9.56 | 10.5 | 11.5 | 23 | 30.6 |
| 9 | 2.03 | 4.05 | 6.08 | 8.1 | 9.11 | 10.1 | 11.1 | 12.2 | 24.3 | 32.4 |
| 9.5 | 2.14 | 4.275 | 6.41 | 8.55 | 9.62 | 10.7 | 11.8 | 12.8 | 25.7 | 34.2 |
| 10 | 2.25 | 4.5 | 6.75 | 9 | 10.1 | 11.3 | 12.4 | 13.5 | 27 | 36 |
| 12 | 2.7 | 5.4 | 8.1 | 10.8 | 12.2 | 13.5 | 14.9 | 16.2 | 32.4 | 43.2 |
| 15 | 3.38 | 6.75 | 10.1 | 13.5 | 15.2 | 16.9 | 18.6 | 20.3 | 40.5 | 54 |
| 20 | 4.5 | 9 | 13.5 | 18 | 20.3 | 22.5 | 24.8 | 27 | 54 | 72 |

For a data transfer rate of 2.9 to 19 Mbps, a magneto-optic disk with a recording capacity of 5 to 12 Gbytes allows recording for 60 to 480 minutes.

A reproduction operation of the recording/reproduction device according to the present embodiment will now be described.

Referring again to FIGS. 11 and 13, semiconductor laser 18 in optical head 36 emits a laser beam of 600 to 700 nm which is transmitted through objective lens 22 with a numerical aperture of 0.52 to 0.65 and radiated to recording surface 23a of a magneto-optic disk. The light reflected from recording surface 23a is detected by photodetectors 25a and 25b to obtain reproduced signal RF. The obtained reproduced signal is sent to and reproduced signal amplifying circuit 40 and then sent to waveform equalizer circuit 41. Waveform equalizer circuit 41 provides waveform equalization and clock generating circuit 42 also separates a clock signal. The reproduced signal having its waveform equalized is sent to decoders 43 and 44 and demodulated in the 1–7 system synchronously with the clock signal sent from clock generating circuit 42. Then, format decoder circuit 45 extracts only the data portion thereof and decoder circuit 46 also clears the compression thereof to output an image signal.

Reproduced signal amplifying circuit 40 amplifies a reproduced signal and also sends data to servo circuit 39 which controls optical head 36 and spindle motor 38 to read data from magneto-optic disk 47. The laser beam wavelength for reproduction is preferably 630 to 690 nm, more preferably 630 to 660 nm, as with that for recording.

Figure 16:
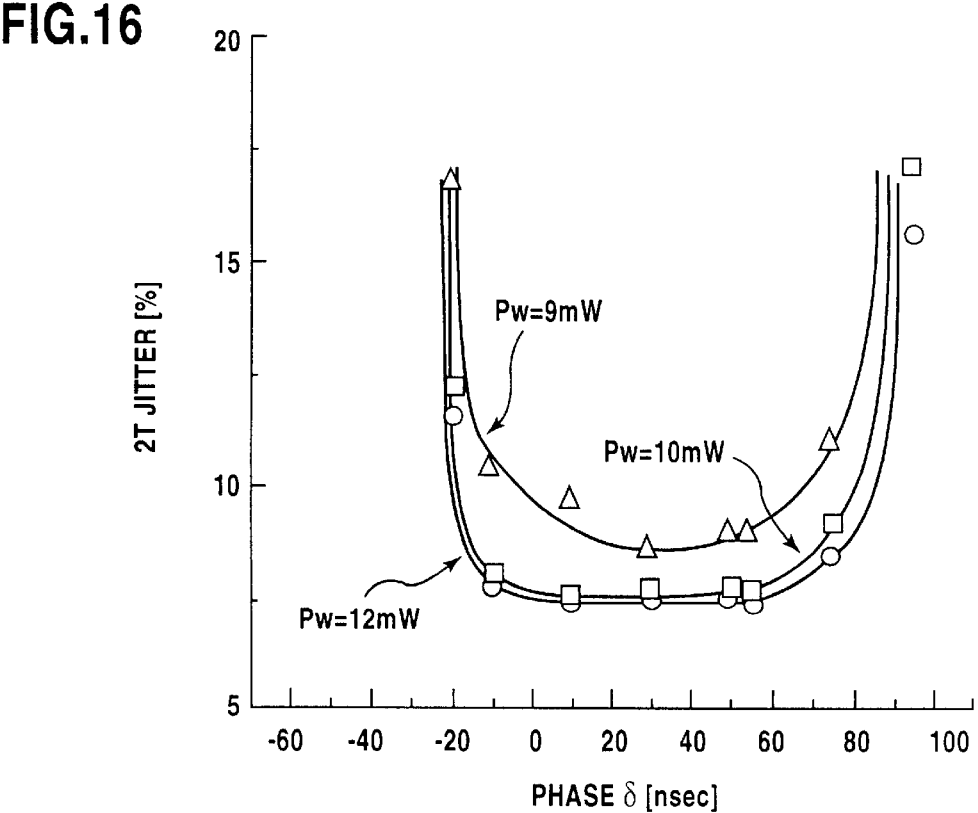
FIG. 16 is a graph of jitter of the minimum domain length versus the phase difference between magnetic field and pulsed laser beam for the FIG. 13 recording/reproduction device for different write powers.

As shown in FIG. 16, for a phase difference of −10 to 70 nsec between magnetic field and pulsed laser beam for a write power Pw of 9 to 12 mW, the jitter of the minimum domain length is 7 to 10%. As write power Pw is increased to e.g. 9 to 10 or 12 mW, jitter is rapidly reduced. For a write power Pw of 10 or 12 mW, jitter is approximately 7%. Thus it is understood that a write power of 9 to 12 mW allows satisfactory recording. A write power of 6 to 15 mW also provides similar characteristic to those described above.

Figure 17:
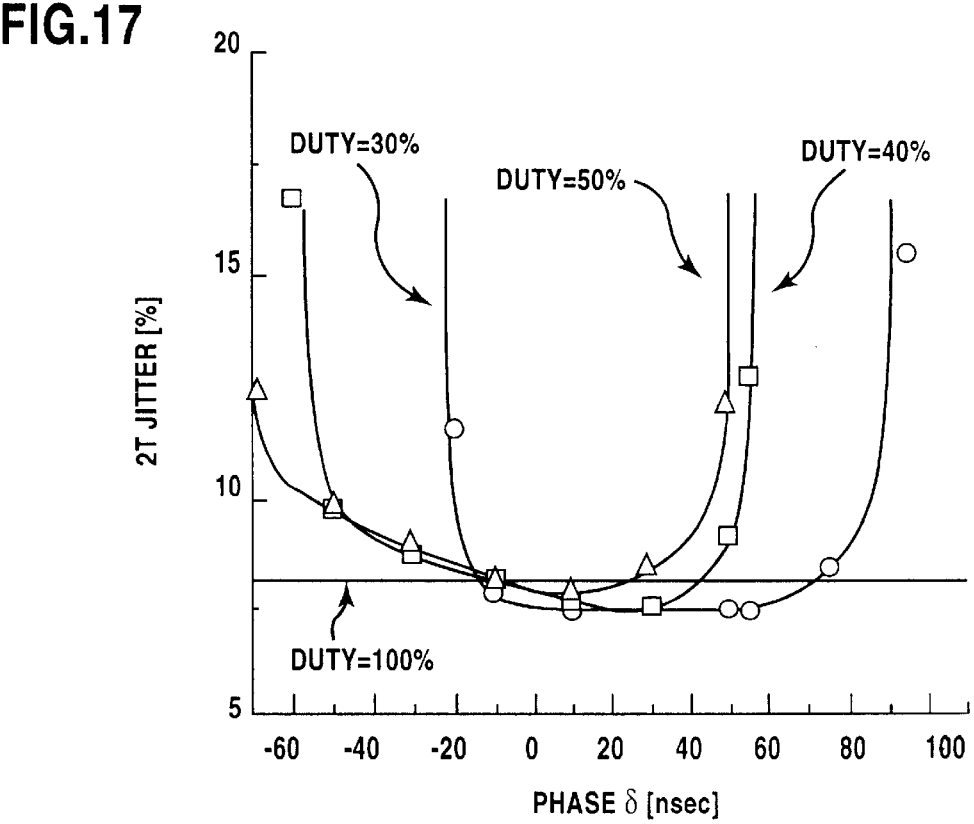
FIG. 17 is a graph of jitter of the minimum domain length versus the phase difference between magnetic field and pulsed laser beam for the FIG. 13 recording/reproduction device for different duty ratios of the pulsed laser beam.

As shown in FIG. 17, for a duty ratio of 30% of a pulsed laser beam, a jitter of approximately 7% is provided with respect to a phase difference of −10 to 70 nsec. For a duty ratio of 40%, a jitter of approximately 7 to 10% is provided with respect to a phase difference of −50 to 50 nsec. For a duty ratio of 50%, a jitter of approximately 8 to 10% is provided with respect to a phase difference of −50 to 30 nsec. Thus it is understood that a duty ratio of 30 to 50% of a pulse laser beam allows satisfactory recording.

It is also understood that the jitter in reproduction with respect to a phase difference of −10 to 60 nsec for a duty ratio of 30%, a phase difference of 0 to 40 nsec for a duty ratio of 40%, or a phase difference of 0 to 20 nsec for a duty ratio of 50% is smaller than that in reproduction for a duty ratio of 100%.

Figure 18A:
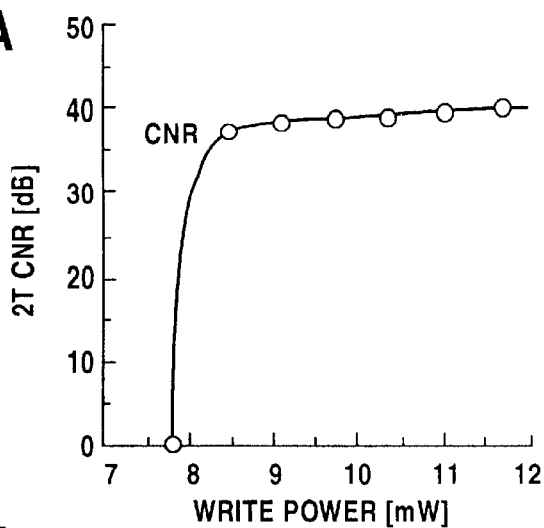
FIGS. 18A–18C are graphs of the CN ratio, cross talk, and cross erase CN ratio versus write power for the FIG. 13 recording/reproduction device, respectively.
Figure 18B:
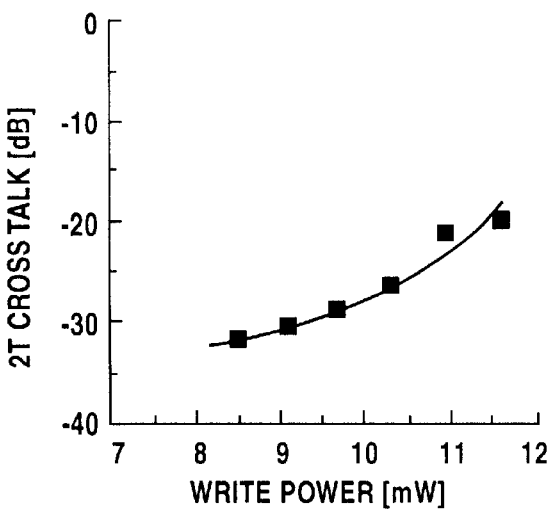
Figure 18C:
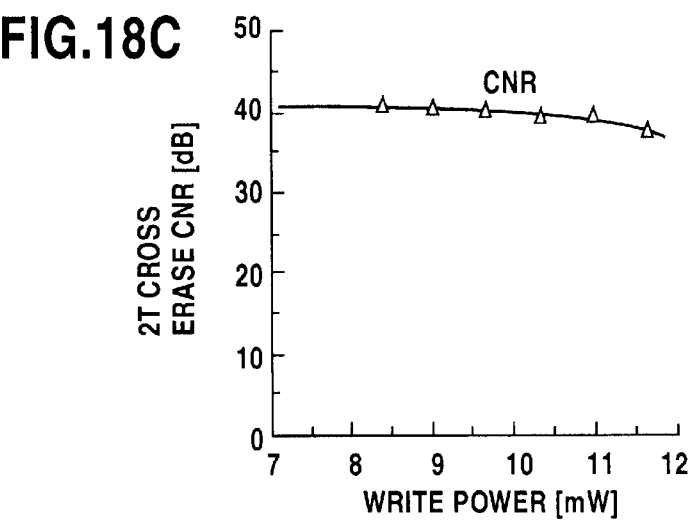

FIG. 18A is a graph of the CN ratio of the minimum domain length versus write power when a signal is recorded only on land 11 and the signal is then reproduced from land 11, FIG. 18B is a graph of cross talk versus write power when a signal is recorded only on land 11 and a signal is then reproduced from groove 16, and FIG. 18C is a graph of the CN ratio of the minimum domain length versus write power when signals are recorded on both land 11 and groove 12 and a signal is then reproduced from land 11.

As shown in FIG. 18A, a write power of greater than 9 mW provides a tolerable CN ratio of 37 to 38 dB. It is also understood from FIG. 18B that for a write power of 9 to 12 mW, cross talk increases with elevation of write power, although it is smaller than −20 dB. As shown in FIG. 18C, a write power of greater than 9 mW provides a tolerable CN ratio of 30 to 40 dB. Thus, as is apparent from the CN ratio and cross talk in reproduction, a laser power of 9 to 12 mW provided in recording allows satisfactory recording.

Figure 19:
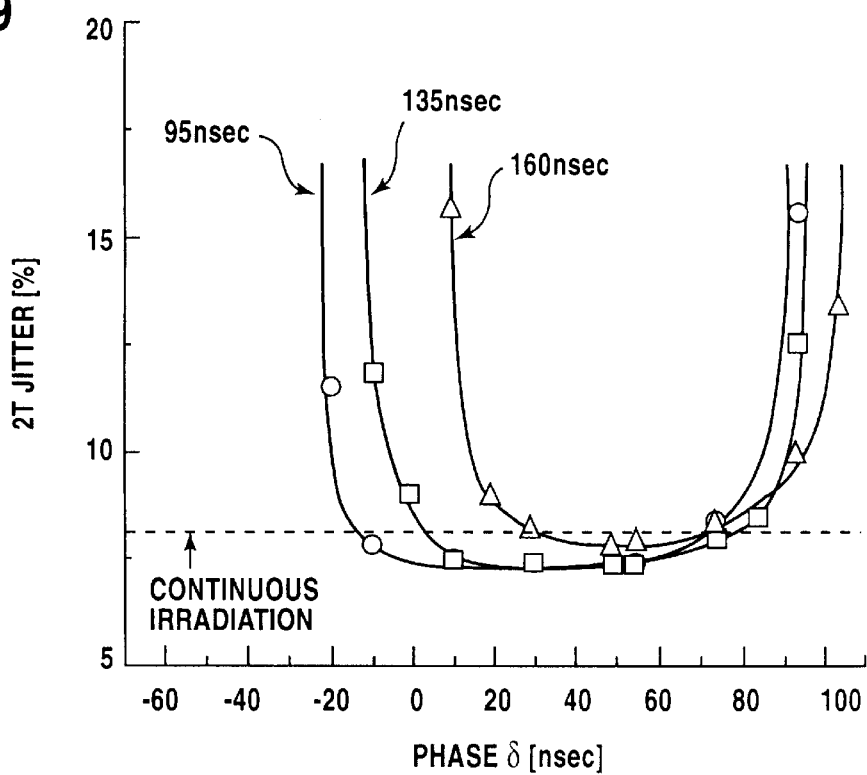
FIGS. 19 and 20 are graphs of jitter of the minimum domain length versus the phase difference between magnetic field and pulsed laser beam for the FIG. 13 recording/reproduction device for various magnetic field rising/falling times.

As shown in FIG. 19, for a magnetic field rising/falling time of 95 or 135 nsec in recording, a tolerable jitter of approximately 7% is provided with respect to a phase difference of 0 to 70 nsec.

It is understood that the jitter in reproduction with respect to a phase difference of −10 to 70 nsec for a magnetic field rising/falling time of 95 nsec in recording, a phase difference of 10 to 70 nsec for a magnetic field rising/falling time of 135 nsec in recording, or a phase difference of 40 to 60 nsec for a magnetic field rising/falling time of 160 nsec in recording is smaller than that in reproduction that is provided without switching the magnetic field.

Figure 20:
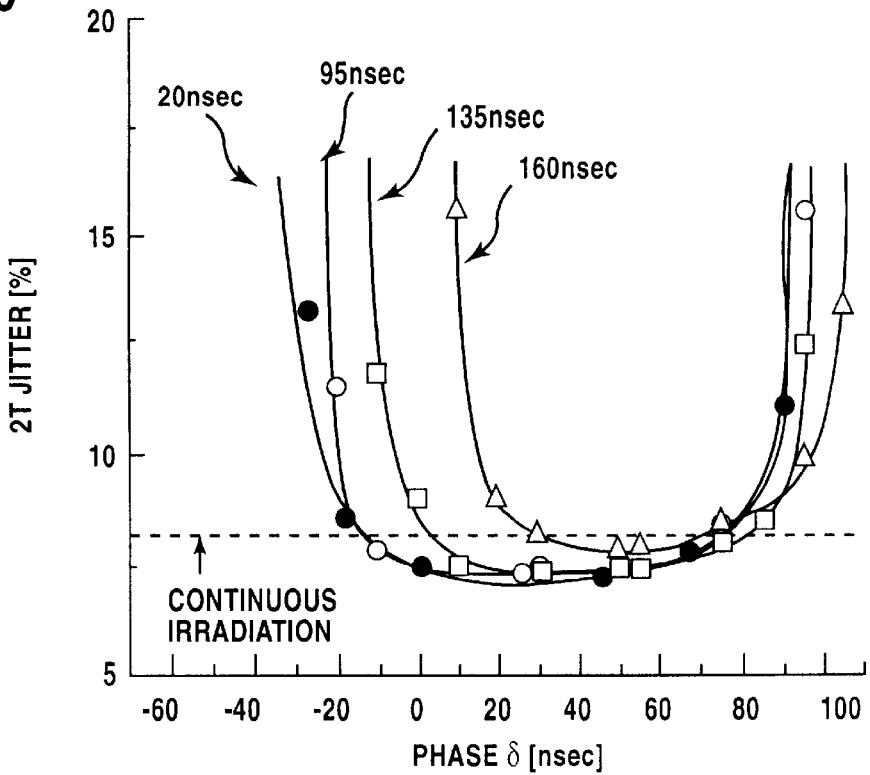

Almost similar to a magnetic field rising/falling time of 95 nsec, a magnetic field rising/falling time of 20 nsec also results in a tolerable jitter, as shown in FIG. 20. Thus a preferable magnetic field rising/falling time is 90 to 160 nsec.

Figure 21:
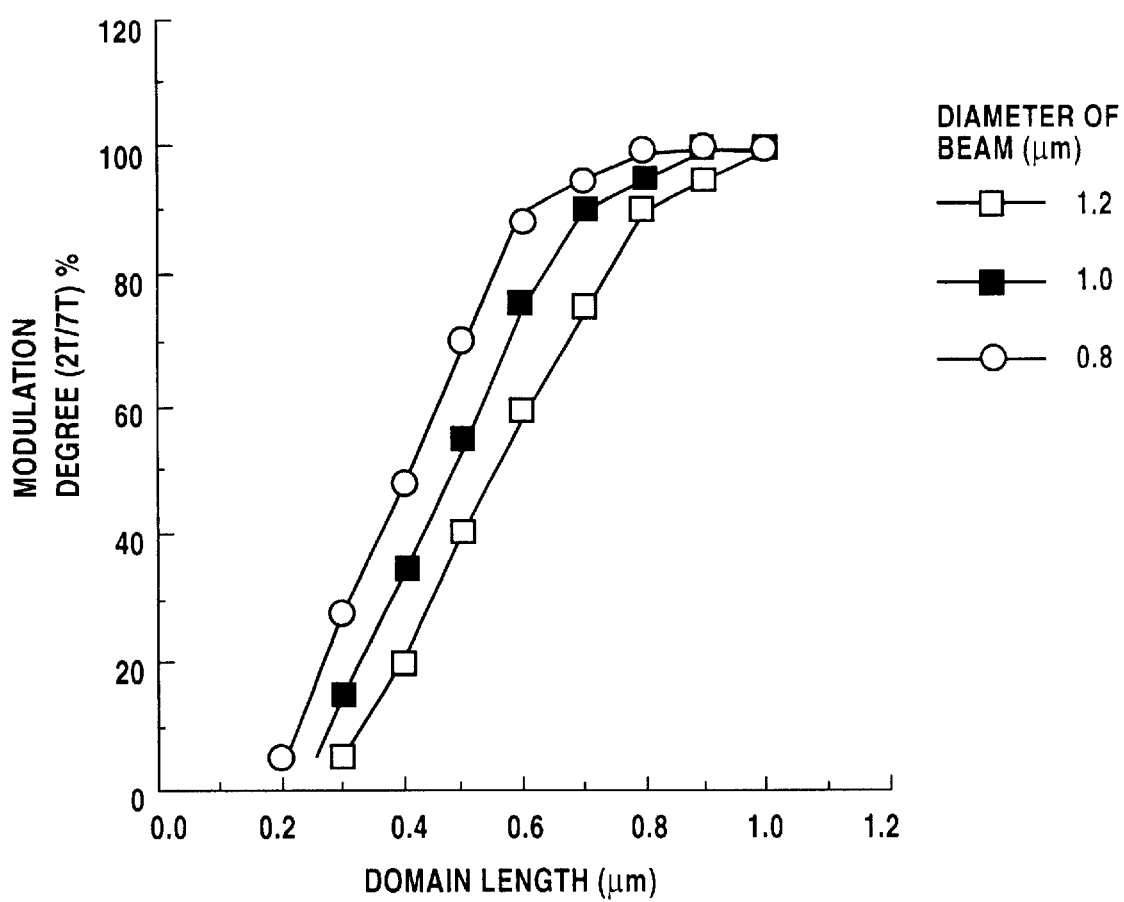
FIG. 21 is a graph of modulation degree of a reproduced signal (2T/7T) versus domain length for the FIG. 13 recording/reproduction device for various laser beam diameters.

FIG. 21 is a graph of modulation degree versus domain length. Modulation degree is defined as the ratio of the minimum domain length (2T) to the maximum domain length (7T) i.e. 2T/7T. The diameter of the laser beam spot provided is 0.8, 1.0 or 1.2 μm. The minimum domain length is 0.25 to 0.45 μm. The above ranges result in a modulation degree of 10 to 50%. For example, the minimum domain length of 0.4 μm provides a modulation degree of approximately 20 to 50%. Thus a magneto-optic disk with large recording capacity can be obtained even for low modulation degree.

Figure 22:
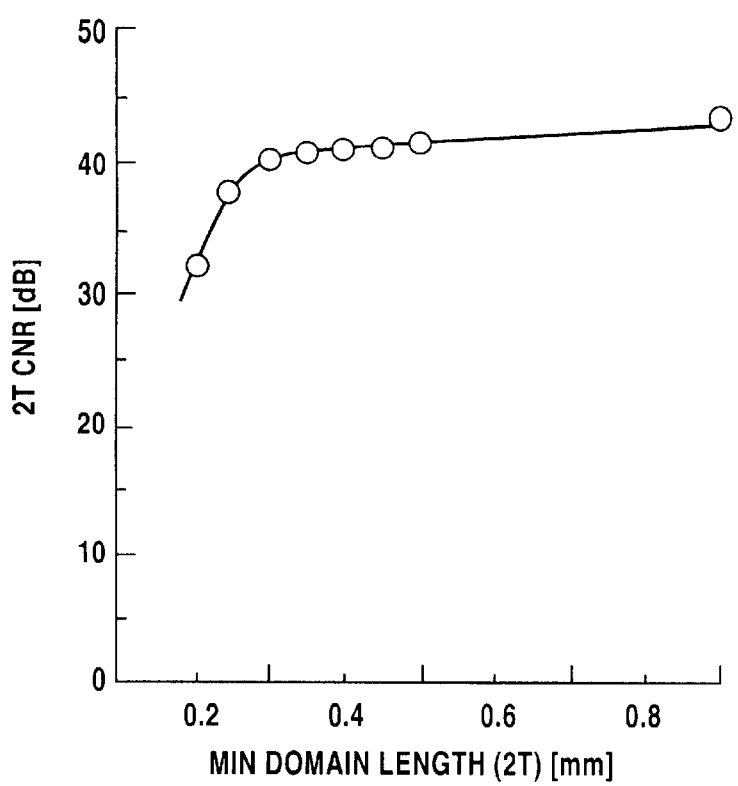
FIG. 22 is a graph of the CN ratio of the minimum domain length versus the minimum domain length for the FIG. 13 recording/reproduction device.

As shown in FIG. 22, the minimum domain length (2T) of 0.25 to 0.45 μm provides a CN ratio of approximately 38 to 41 dB in reproduction. However, the CN ratio in reproduction is not limited to this range and it may be 30 to 50 dB.

Figure 23:
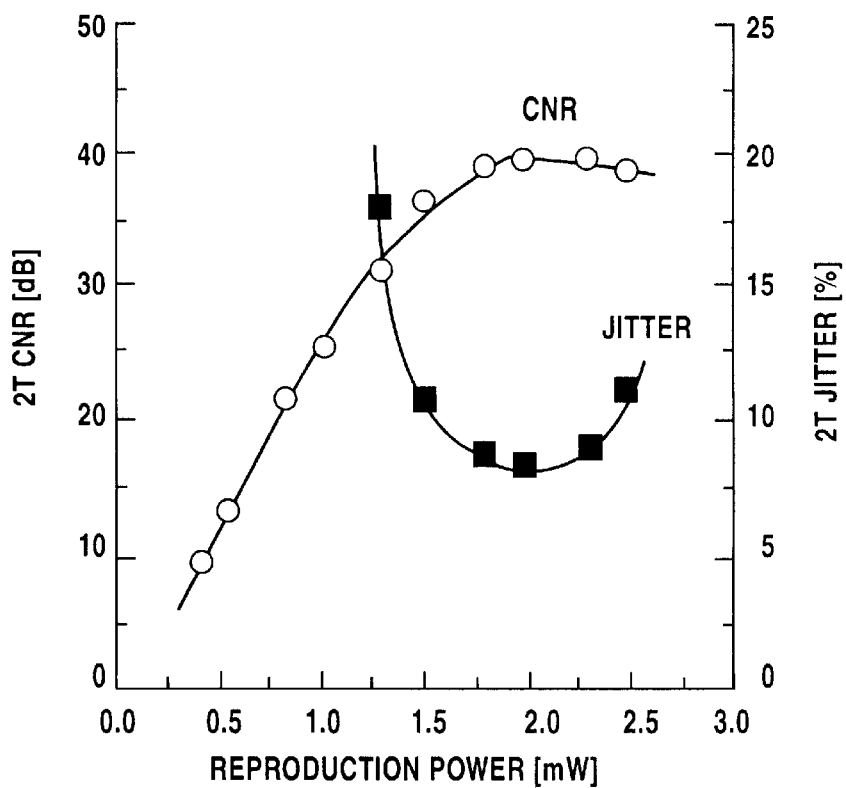
FIG. 23 is a graph of the CN ratio and jitter of the minimum domain length versus reproduction power for the FIG. 13 recording/reproduction device.

As shown in FIG. 23, a reproduction power of 1.5 to 2.5 mW provides a CN ratio of 38 to 40 dB in reproduction and a jitter of 7 to 12% of the minimum domain length. A reproduction power of 1.7 to 2.3 mW provides a CN ratio of 39 to 40 dB and a jitter of 7 to 8% of the minimum domain length. It is thus understood that reproduction power is preferably 1.5 to 2.5 mW, more preferably 1.8 to 2.3 mW.

FIG. 5 is a graph of the CN ratio in reproduction and cross talk versus groove depth. The diameter of the laser beam spot provided is 1.05 μm and the track pitch provided is 0.65 μm. As shown in FIG. 5, the CN ratio in reproduction is reduced as the groove deepens, while a groove depth of 30 to 60 nm provides a tolerable CN ratio of 38 to 43 dB. Cross talk is increased as the groove deepens, while the groove depth in the range mentioned above provides a cross talk of 18 to 25 dB. It is thus understood that this range allows satisfactory recording and reproduction.

Second Embodiment

Figure 11:
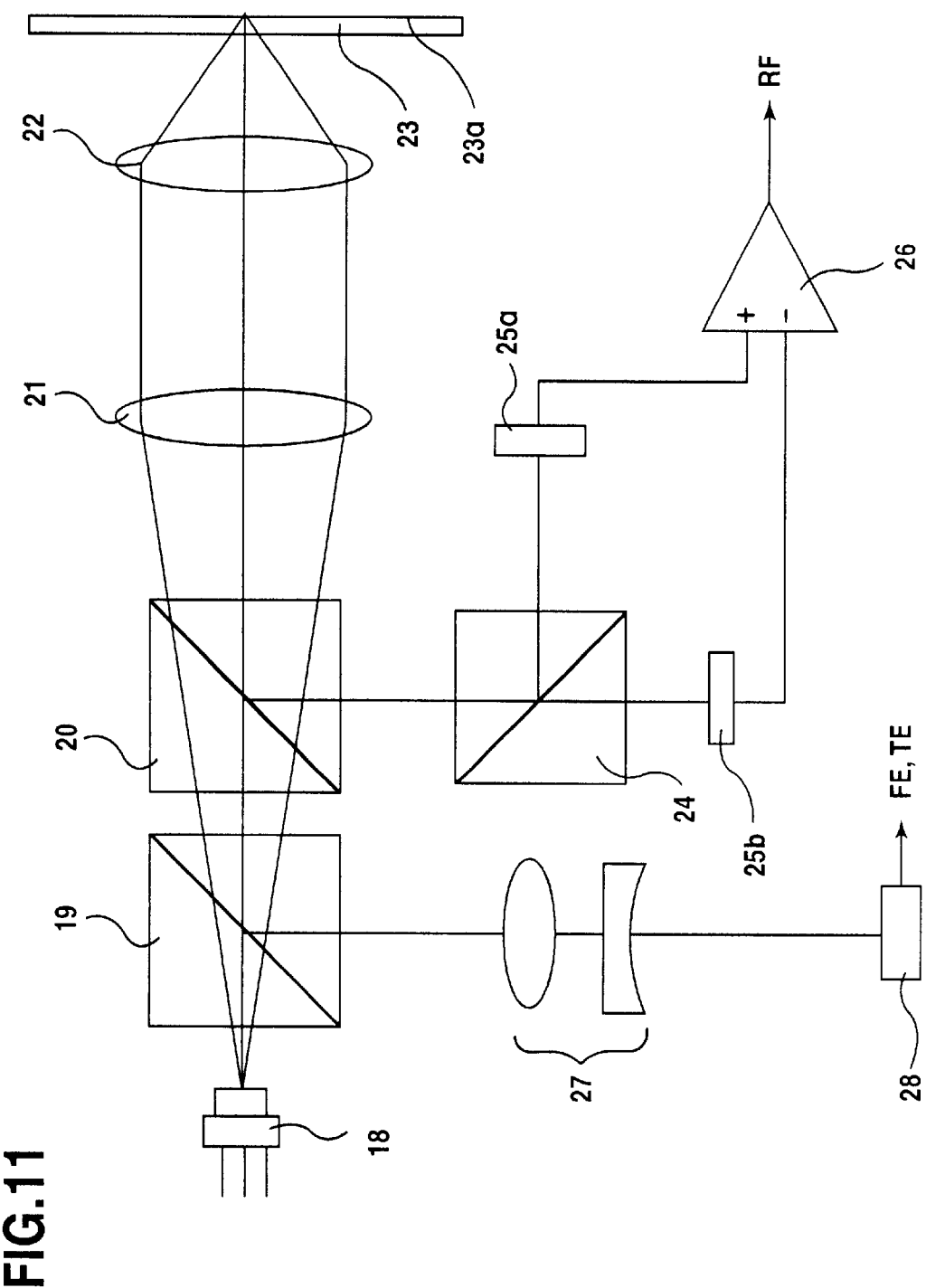
FIG. 11 shows a configuration of an optical head in a recording/reproduction device according to the first embodiment.
Figure 24:
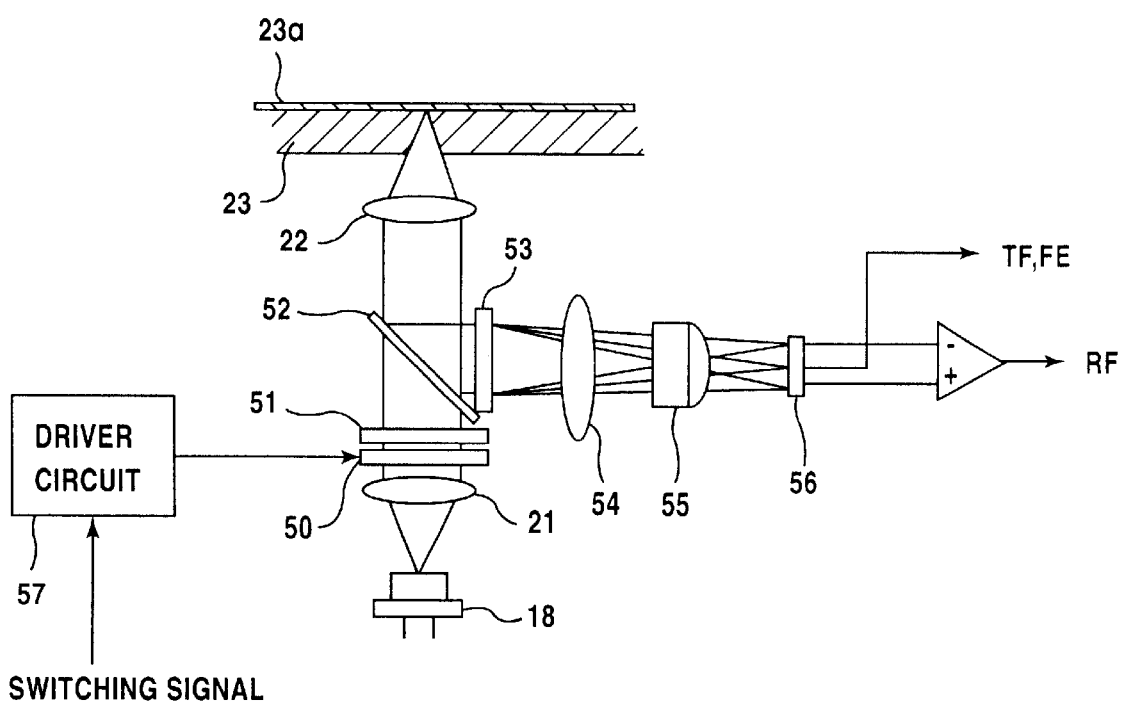
FIG. 24 shows a configuration of an optical head in a recording/reproduction device according to a second embodiment of the present invention.

The optical head in the recording/reproduction device for magneto-optic disks according to the present invention is not limited to the first embodiment shown in FIG. 11 and the optical head shown in FIG. 24 is also suitable.

For the optical head shown in FIG. 24, a laser beam with a wavelength of 635 nm (with a tolerance of ±15 nm) generated from semiconductor laser 18 is collimated by collimator lens 21 and enters objective lens 22 via a polarization rotating unit 50, a polarizing filter 51 and a halfmirror 52. The laser beam incident on objective lens 22 is collected by objective lens 22 and radiated to recording surface 23a via substrate 23 of a super-resolution magneto-optic disk. The laser beam reflected from recording surface 23a returns via substrate 23 and objective lens 22 to halfmirror 52 which transmits half of the laser beam and reflects the remaining half of the laser beam. The laser beam reflected from halfmirror 52 is collected via a Wollaston prism 53, a conversing lens 54 and a cylindrical lens 55 and enters a photodetector 56 which detects reproduced signal RF, tracking error signal TF and focus error signal FE. In the present embodiment, the wavelength of the laser beam provided is 400 to 800 nm, preferably 600 to 800 nm.

Figure 25:
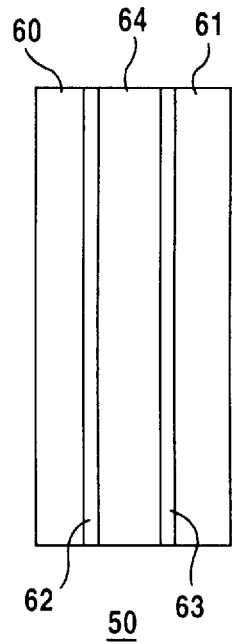
FIG. 25 is a side view of the structure of the polarization rotating unit shown in FIG. 24.

Polarization rotating unit 50 includes transparent glass plates 60 and 61, transparent electrodes 62 and 63 of e.g. ITO formed on the respective inner surfaces of glass plates 60 and 61, and twisted nematic (TN) type liquid crystal 64 interposed between transparent electrodes 62 and 63, as shown in FIG. 25. When a driver circuit 57 does not apply voltage to transparent electrode 62 or 63, the laser beam incident on polarization rotating unit 50 has its plane of polarization rotated by TN-type liquid crystal 64 by 90° and emanates therefrom. When driver circuit 57 applies voltage to transparent electrodes 62 and 63, polarization rotating unit 50 transmits a laser beam intact without rotating its plane of polarization.

Figure 26A:
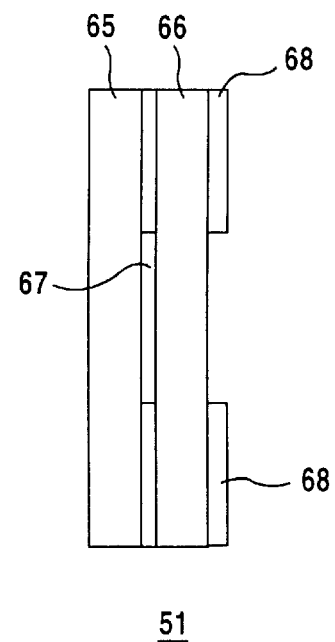
FIG. 26A is a side view of the configuration of the polarizing filter shown in FIG. 25.
Figure 26B:
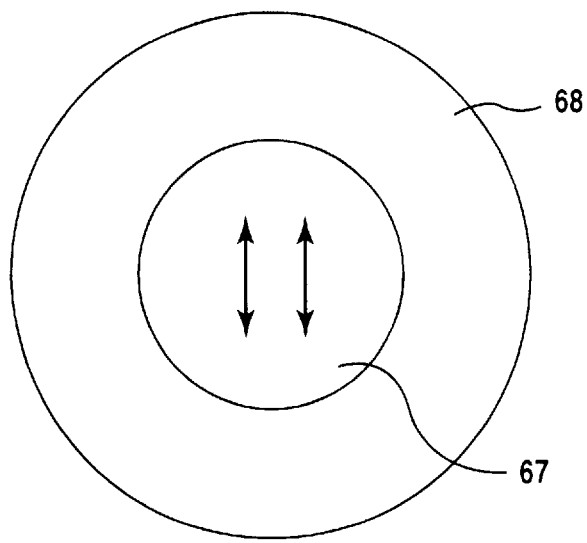
FIG. 26B is a front view of the polarizing filter shown in FIG. 26A.

Polarizing filter 51 includes transparent glass plate 65 and 66, a polarizing film 67 interposed between glass plates 65 and 66, and a transparent film 68 stuck on an outer surface of one glass plate 66, as shown in FIGS. 26A and 26B. Polarizing film 67 is mounted to the centers of glass plates 65 and 66. Polarizing film 67 only transmits laser beams polarized in the vertical direction of FIG. 26B and has a transmissivity of approximately 70 to 90%. Accordingly, condensation characteristics will be degraded in recording on a super-resolution magneto-optic disk unless polarizing filter 51 has the outer periphery approximately as low in transmissivity as the inner periphery. Accordingly a transparent film 68 with a transmissivity of approximately 70 to 90% is stuck thereto. Glass plates 65 and 66 may be of any material that is transparent and has superior optical characteristics, such as polycarbonate, resin like PMMA.

FIG. 26B shows polarization characteristics of polarizing filter 51. At the center of polarizing filter 51, polarizing film 67 transmits 70 to 90% of only a laser beam polarized in the vertical direction of the figure. At the outer periphery, a laser beam is transmitted at the same transmissivity as that of the inner periphery, i.e. approximately 70 to 90%, regardless of the polarization direction of the laser beam.

When objective lens 22 has a numerical aperture NA of 0.55 (with a tolerance of ±0.05) and a diameter of effective luminous flux is 4 mm, the diameter of polarizing film 67 is determined so that a beam of main lobe provided by optical super-resolution has a diameter of 0.7 to 1.1 $\mu$m. When a diameter of effective luminous flux is not 4 mm, the diameter of polarizing film 67 is determined in proportion to the diameter of effective luminous flux so that a beam of the main lobe has the diameter of 0.7 to 1.1 $\mu$m.

Figure 27:
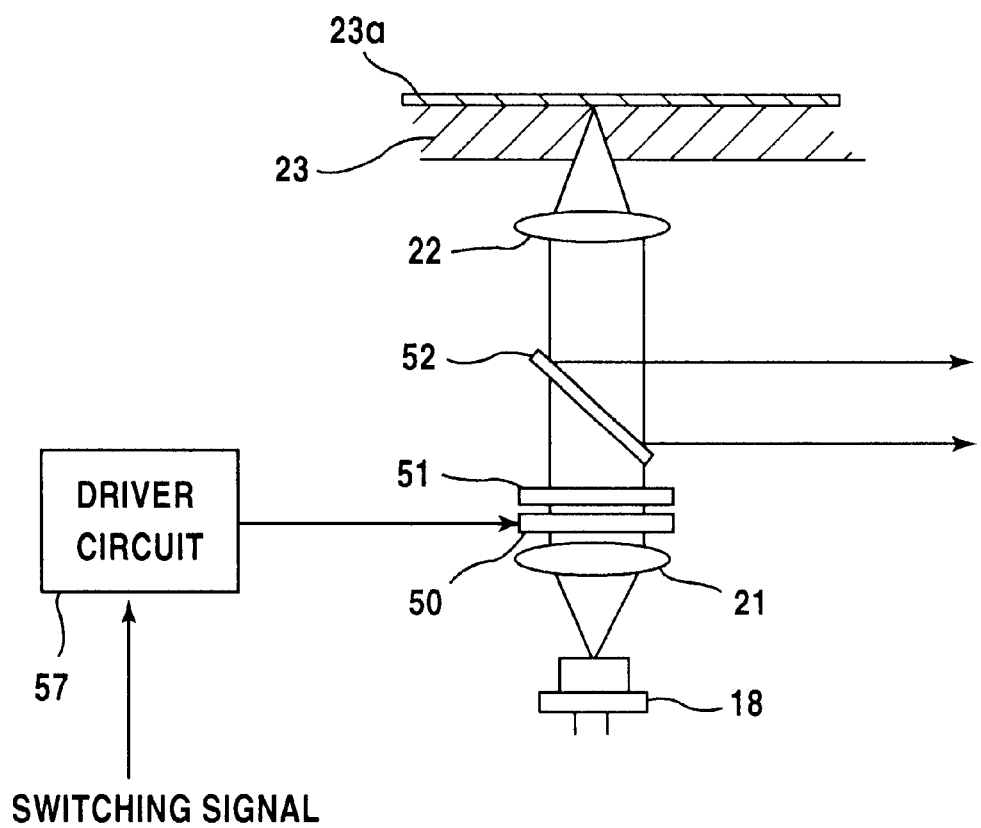
FIG. 27 is an enlarged view of the optical head shown in FIG. 24.

A recording operation of the recording/reproduction device according to the present embodiment will now be described with reference to FIG. 27. Voltage is not applied to polarization rotating unit 50 in recording a signal on a magneto-optic disk. Thus a laser beam emanating from collimator lens 21 that is polarized in a direction perpendicular to the plane of the figure has its plane of polarization entirely rotated by polarization rotating unit 50 by 90° and is thus transmitted through polarizing filter 51. Thus a laser beam polarized in a direction parallel to the plane of the figure emanates from polarization rotating unit 50. Since polarizing film 67 of polarizing filter 51 has polarization characteristics which provide polarization in a direction parallel to the plane of the figure, a laser beam incident on polarizing filter 51 is not blocked by and is thus entirely transmitted through polarizing filter 51. The transmitted laser beam enters objective lens 22 via halfmirror 52 and is radiated to recording surface 23a of the magneto-optic disk via substrate 23 to record information thereon. A laser beam spot formed on recording surface 23a has a diameter of 0.76 $\mu$m.

Figure 28A:
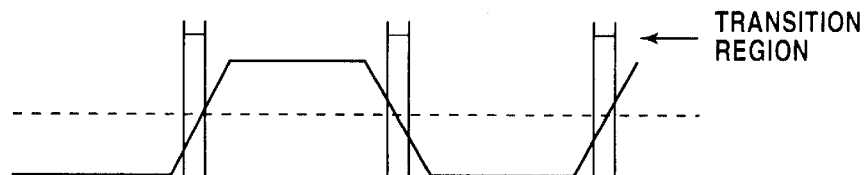
FIGS. 28A–28C are views for illustrating a relation between a magnetic field, a pulsed laser beam and a recording domain.
Figure 28B:
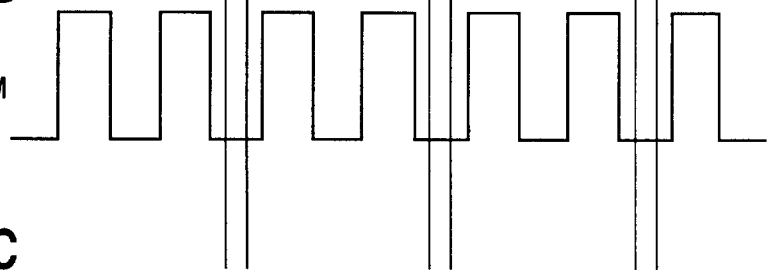
Figure 28C:
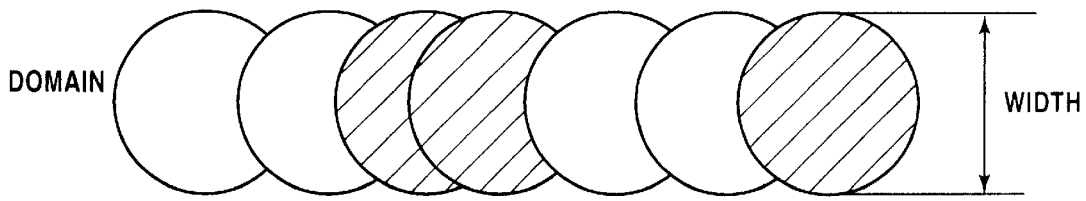

The plurality of magnetic field applied in recording varies as shown in FIG. 28A, and a laser beam is pulsed as shown in FIG. 28B. Thus, the laser beam is radiated twice to a magneto-optic disk while a positive or negative magnetic field is provided to the magneto-optic disk once. Thus, the width of a recording domain exceeding the Curie temperature is smaller than conventional, as shown in FIGS. 28C. Thus the magneto-optic disk and recording/reproduction device therefor described above allows signals to be recorded at high density.

Other operations will not be described here since they have been described with reference to FIG. 24. It should be noted that a signal to be recorded is NRZI (Non Return Zero Inverse)-modulated.

Figure 29:
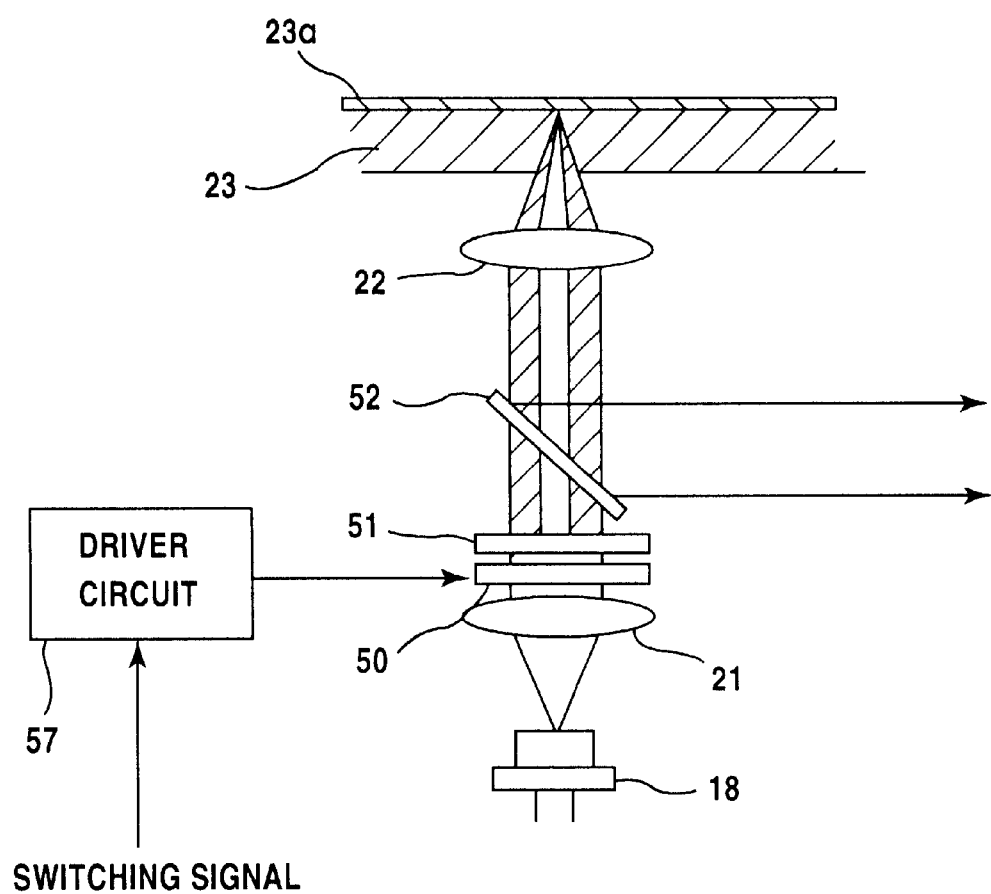
FIG. 29 is a view for illustrating a reproduction operation of the FIG. 24 optical head.

A reproduction operation of the recording/reproduction device will now be described with reference to FIG. 29. In reproducing a signal from a magneto-optic disk, voltage is applied to polarization rotating unit 50. Accordingly, polarization rotating unit 50 transmits a laser beam emanating from collimator lens 21 that is polarized in a direction perpendicular to the plane of the figure, without rotating is plane of polarization. The transmitted laser beam enters polarizing filter 51. Since polarizing film 67 of polarizing filter 51 only transmits a laser beam polarized in a direction parallel to the plane of the figure, polarizing filter 51 blocks the center of the laser beam and only transmits the outer periphery of the laser beam. The ring-shaped laser beam emanating from polarizing filter 51 enters objective lens 22 via halfmirror 52 and is radiated to recording surface 23a of the magneto-optic disk via substrate 23. The laser beam radiated to recording surface 23a forms side lobe as well as main lobe. The diameter of a main lobe beam is 0.9 $\mu$m and is thus smaller than that of a beam in recording described above. Other operations in this example will also not be described here since they have been described with reference to FIG. 24.

While for the above embodiment, polarization rotating unit 50 rotates a plane of polarization of a laser beam entirely and polarizing filter 51 has polarizing film 67 corresponding to the center of the laser beam, a polarization rotating unit may have a transparent electrode patterned into the center and the outer periphery and a polarizing film may be mounted to the entirety of a polarizing filter. For such a polarization rotating unit, voltage can be applied separately to the transparent electrode provided at the center and the transparent electrode provided at the outer periphery. In recording a signal on a magneto-optic disk, neither the transparent electrode at the center nor the transparent electrode at the outer periphery receive voltage and a plane of polarization of a laser beam is rotated entirely by 90°. Since the polarizing film mounted to an entire surface of the polarizing filter has a polarization direction parallel to a polarization direction of the rotated plane of polarization of the laser beam, the laser beam is entirely transmitted through the polarizing filter and radiated to recording surface 23a of the magneto-optic disk.

For reproducing a signal from a magneto-optic disk, only the transparent electrode provided at the center receives voltage while the transparent electrode provided at the outer periphery does not receive voltage. Thus the polarization rotating unit transmits the center of a laser beam without a 90° rotation of the plane of polarization. The outer periphery of the laser beam has a plane of polarization rotated by 90° and is thus transmitted through the polarization rotating unit. Thus the polarizing filter transmits the outer periphery of the laser beam with the rotated plane of polarization while it blocks the center of the laser beam free from rotation of the plane of polarization. Thus a ring-shaped laser beam emanates from the polarizing filter, enters the objective lens via the halfmirror and is radiated to the recording surface of the magneto-optic disk via the objective lens.

While the above embodiment provides polarization rotating unit 50 and polarizing filter 51 positioned between collimator lens 21 and halfmirror 52, unit 50 and filter 51 may be arranged at any positions between semiconductor laser 18 and objective lens 22.

While polarizing filter 51 shown in FIG. 26B is provided with a round polarizing film 67, polarizing film 67 is not limited to round shape and may be a polygon with three to eight corners.

Figure 30A:
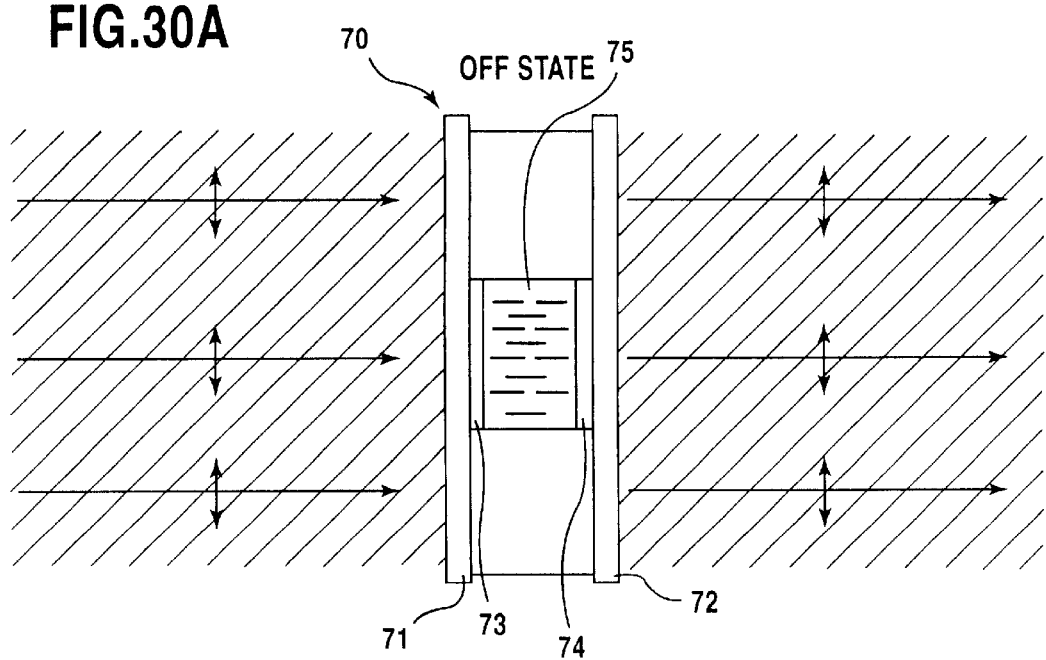
FIGS. 30A and 30B illustrate an operation of a liquid crystal shutter substituted for the polarization rotating unit and polarizing filter shown in FIG. 24.
Figure 30B:
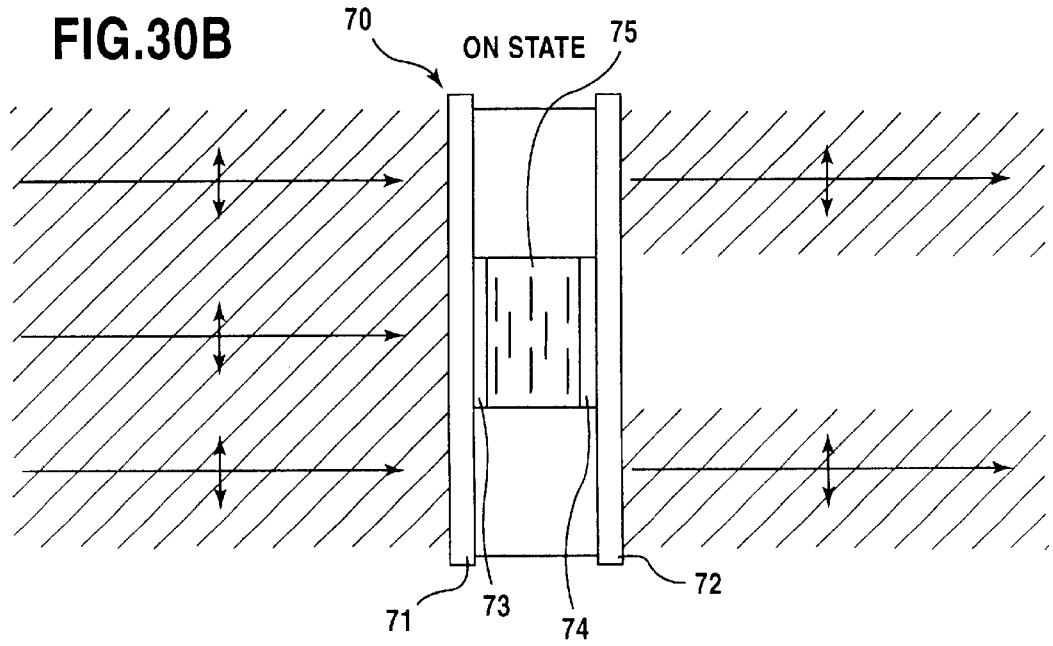

Polarization rotating unit 50 and polarizing filter 51 may be substituted with a liquid crystal shutter 70 shown in FIGS. 30A and 30B. Liquid crystal shutter 70 includes transparent glass plates 71 and 72, transparent electrodes 73 and 74 of e.g. ITO formed on their respective inner surfaces located at the centers of glass plate 71 and 72, and a guest host type liquid crystal 75 interposed between glass plates 71 and 72.

As shown in FIG. 30A, when voltage is not applied to either transparent electrode 73 or transparent electrode 74, liquid crystal shutter 70 transmits a laser beam entirely. As shown in FIG. 30B, when voltage is applied to transparent electrodes 73 and 74, liquid crystal shutter 70 only transmits the center of a laser beam and blocks the outer periphery of the laser beam.

Figure 31A:
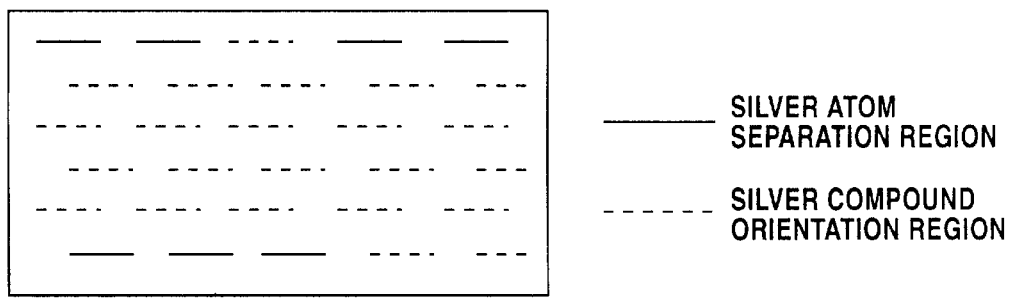
FIGS. 31A and 31B are front views of a polarizing glass substituted for the polarizing filter shown in FIGS. 26A and 26B.
Figure 31B:
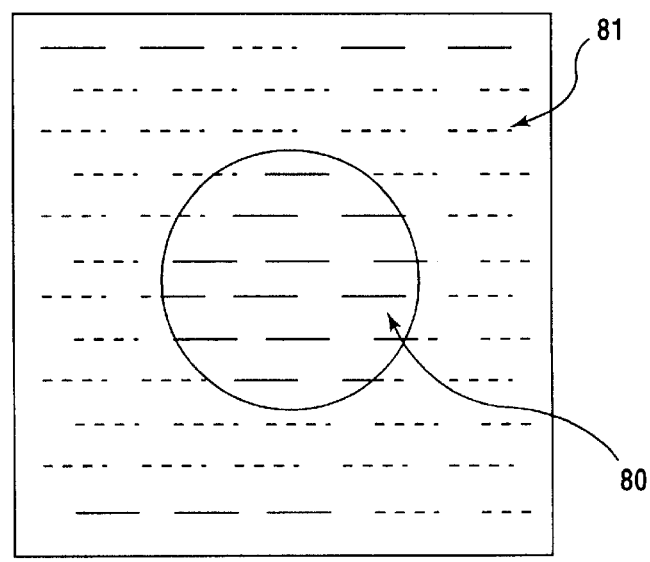

Polarizing filter 51 may be substituted with a polarization-selective hologram or a polarizing glass shown in FIGS. 31A and 31B. In place of polarizing filter 51, a thin optical film with polarization selectivity may also be formed on a surface of an optic, such as halfmirror 52, positioned between polarization rotating unit 50 and objective lens 22.

A polarizing glass is manufactured by arranging silver compound in a predetermined direction in glass and reducing the surface to separate silver. The film of the reduced silver has polarization characteristics. Thus, for the polarizing glass substituted for polarizing filter 51, the silver at a center 80 is only separated while the silver at a periphery 81 is not separated, as shown in FIGS. 31B. Thus the polarizing glass has polarization characteristics at center 80 but not at periphery 81.

Since silver is employed for the aforementioned polarizing glass, center 80 can transmit 100% of a laser beam having the same plane of polarization as center 80. This eliminates the necessity of sticking transparent film 68 to the periphery to reduce transmissivity, as shown in FIGS. 26A and 26B. Thus, sufficient quantity of light can be obtained when the luminous flux of a laser beam is reduced. While silver is a preferable material to provide polarization characteristics to a polarizing glass, any other metal material that provides polarization characteristics may be used for the polarizing glass.

While the above embodiment employs TN-type liquid crystal 64 for electrically rotating a plane of polarization, it may be substituted with super twisted nematic (STN) liquid crystal or ferroelectric liquid crystal. When ferroelectric liquid crystal receives positive voltage for short period of time, it rotates a plane of polarization of a laser beam by 45° and maintains that condition. When ferroelectric liquid crystal receives negative voltage for short period of time, it rotates a plane of polarization of a laser beam by 45° in the direction opposite to that provided when positive voltage is applied, and maintains that condition. Accordingly, ferroelectric liquid crystal can rotate a plane of polarization of a laser beam by 90° when it receives positive voltage in reproduction and negative voltage in recording. Such ferroelectric liquid crystal allows reduction in the application time of the voltage for rotating a plane of polarization and hence reduction of power consumption.

Figure 32:
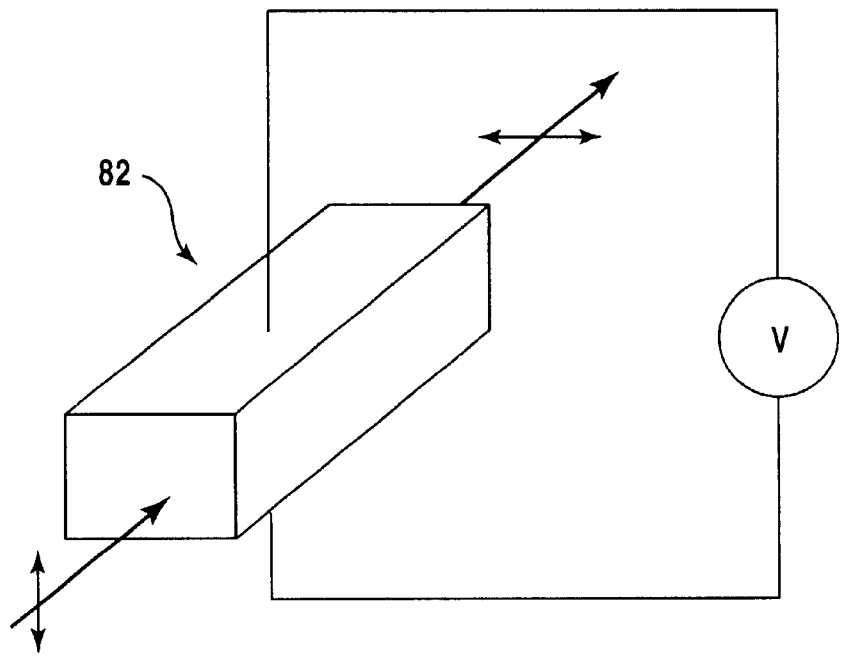
FIG. 32 illustrates the operation principle of Pockels cell substituted for the TN-type liquid crystal shown in FIG. 25.

TN-type liquid crystal 64 may be substituted with a Pockels cell 82 shown in FIG. 32. When Pockels cell 82 receives a predetermined voltage, it polarizes a laser beam having a plane of polarization in the vertical direction of the figure to a laser beam having a plane of polarization in the horizontal direction of the figure. The applied voltage can be adjusted to change and thus adjust the rotation angle of the plane of polarization to obtain the optimal recording/reproduction characteristics.

Figure 33:
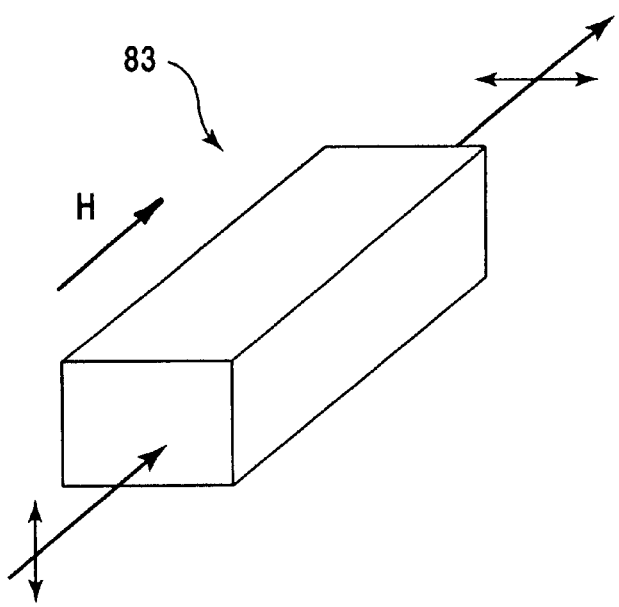
FIG. 33 illustrates the operation principle of a Faraday element substituted for the TN-type liquid crystal shown in FIG. 25.

TN-type liquid crystal 64 may be substituted with a Faraday element 83 which magnetically rotates a plane of polarization, as shown in FIG. 33. When a magnetic field H is applied to Faraday element 83, Faraday element 83 rotates a plane of polarization of a laser beam by 90°. Since for Faraday element 83 a direction in which a laser beam passes corresponds to a direction in which magnetic field H is applied, a coil is wounded around a cylinder or the like for supporting Faraday element 83. This simplifies the fabrication and structure of Faraday element 83.

Figure 34:
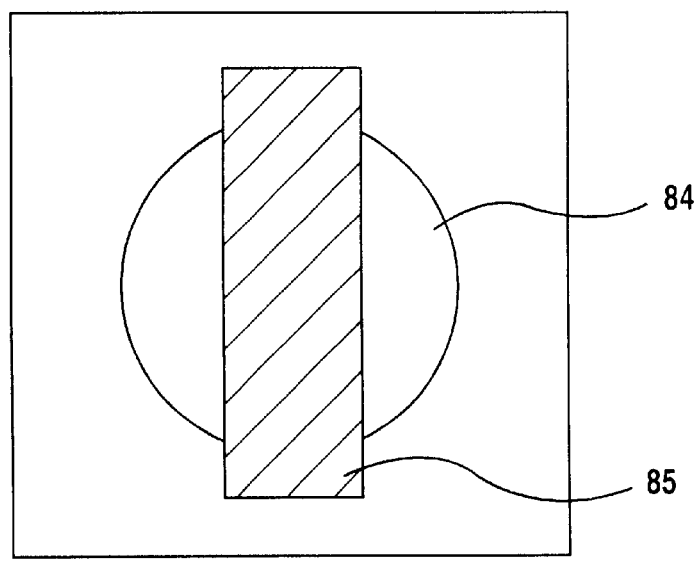
FIGS. 34–36 show shapes of portions for blocking the center of a laser beam for the FIG. 24 optical head.
Figure 35:
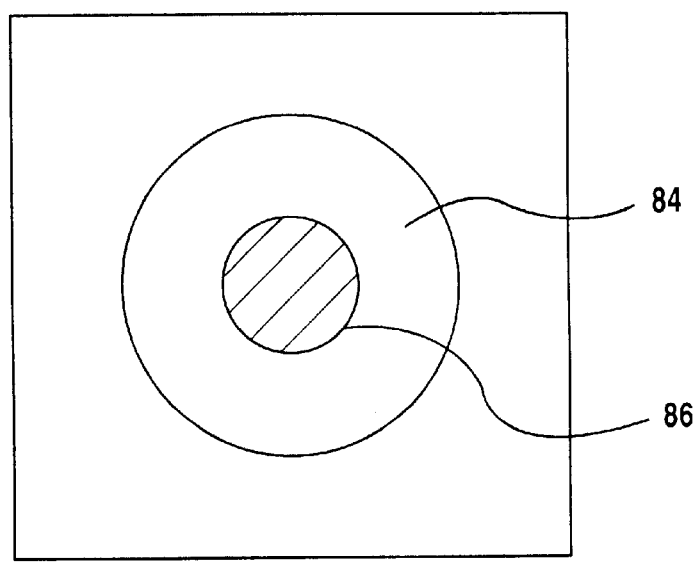

For the present embodiment, a light blocker 85 or 86 for blocking the center of a laser beam 84 suitably has a rectangular or round shape, as shown in FIGS. 34 or 35. Also suitable is a light blocker 87 which does not completely block the center point of a laser beam 84 and provides a transmissivity gradually reduced outwards from the center point. As compared with a laser beam with its center point completely blocked, a laser beam blocked by light blocker 87 that is radiated to a recording surface of a magneto-optic disk can form a side lobe having an intensity sufficiently smaller than that of main lobe, or the diameter of a main lobe beam can further be reduced when both side lobes have a same intensity.

Figure 36:
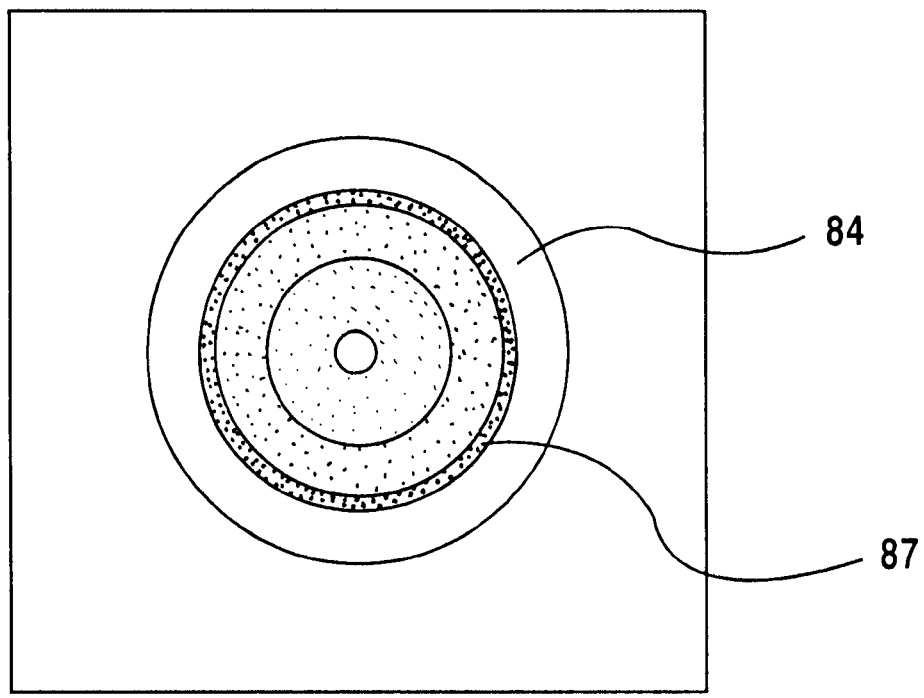
Figure 37:
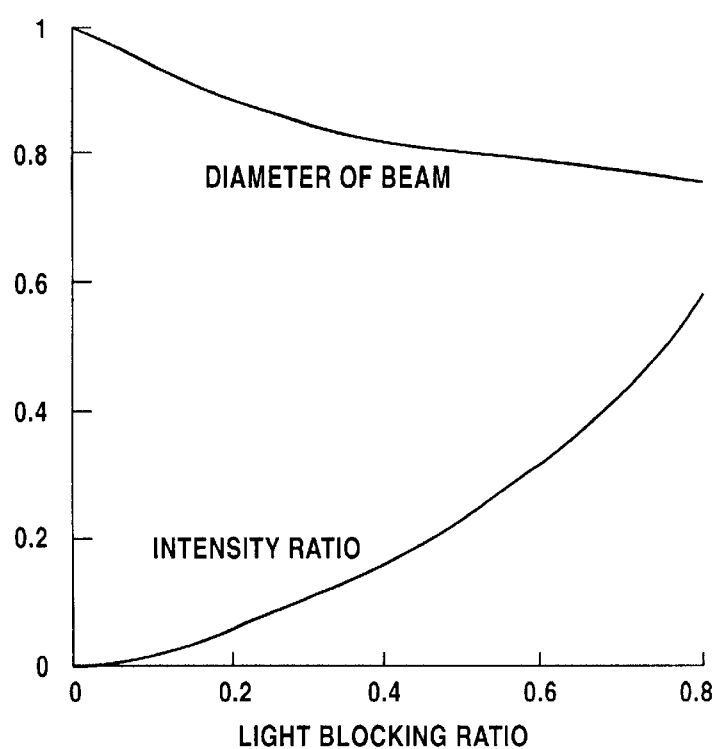
FIG. 37 is a graph of intensity ratio (referring to side lobe intensity/main lobe intensity hereinafter) versus light blocking ratio and a graph of the diameter of a main lobe beam versus light blocking ratio when the FIG. 35 round light blocker is used.

As shown in FIG. 37, as light blocking ratio is increased, intensity ratio is also increased while the diameter of main lobe beam is decreased. Even a light blocking ratio of 0.8 only provides an intensity ratio increased to no more than approximately 0.6, while providing a diameter of a main lobe beam that is reduced to only approximately 0.8, as compared with that provided when the beam is not blocked (i.e. for a light blocking ratio of 0). For round light blocker 87 as shown in FIG. 36, a preferable light blocking ratio is 0.4 to 0.8.

Figure 38:
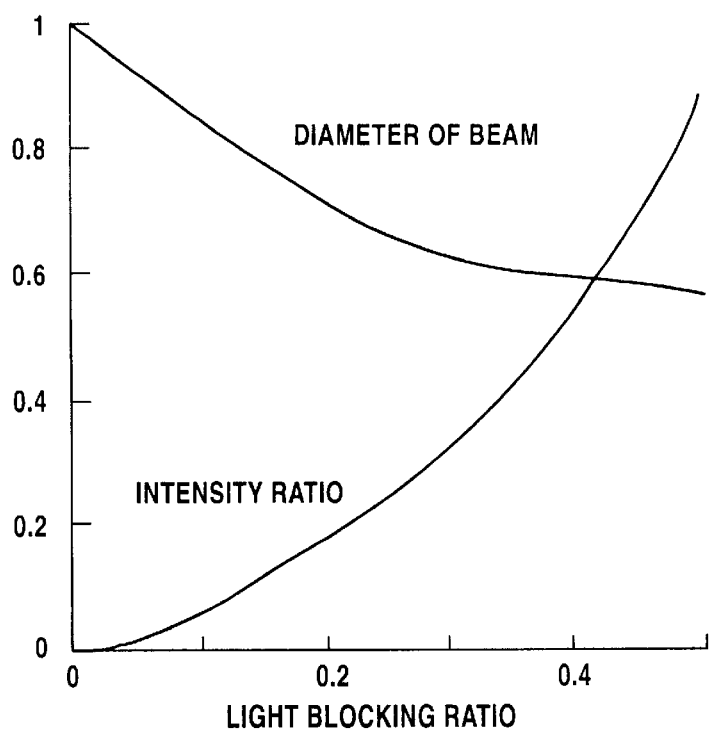
FIG. 38 is a graph of intensity ratio versus light blocking ratio and a graph of the diameter of a main lobe beam versus light blocking ratio when FIG. 34 rectangular light blocker is used.

For rectangular light blocker 85 as shown in FIG. 34, intensity ratio exceeds 0.5 when a light blocking ratio of approximately 0.4 is reached, as shown in FIG. 38. Meanwhile, the diameter of a main lobe beam can be reduced to approximately 0.6, as compared with a case without blocking the beam. Thus, for rectangular light blocker 85, a preferable light blocking ratio is 0.2 to 0.45.

Figure 39:
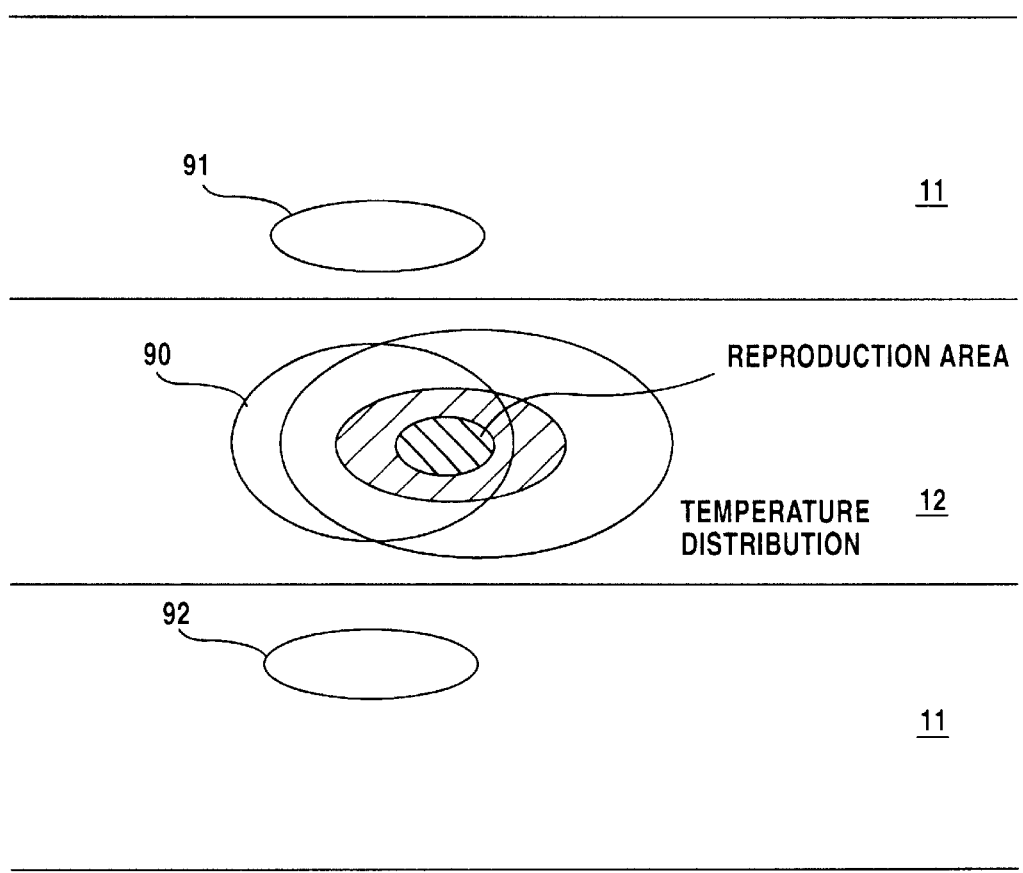
FIG. 39 shows a radiation state of a laser beam on a magneto-optic disk when the FIG. 34 rectangular light blocker is used.

When rectangular light blocker 85 shown in FIG. 34 is used to reproduce a signal from a magneto-optic disk, a laser beam radiated to the magneto-optic disk forms a main lobe 90 and side lobes 91 and 92, as shown in FIG. 39. Main lobe 90 is radiated within groove 12 and the pair of side lobes 91 and 92 is radiated within lands 11. For rectangular light blocker 85, appropriate selection of light blocking ratio allows the temperature of the portion irradiated with side lobe 91 to be lower than the Curie point, i.e. 150° C. to prevent erroneous signal reproduction from land 11.

While the present embodiment provides a light blocker inserted in a tangential direction to avoid effects of side lobes 91 and 92 and thus enhance track density, a light blocker can also be inserted in a direction in which a track runs to avoid effects of the side lobes and thus enhance linear density.

Figure 40:
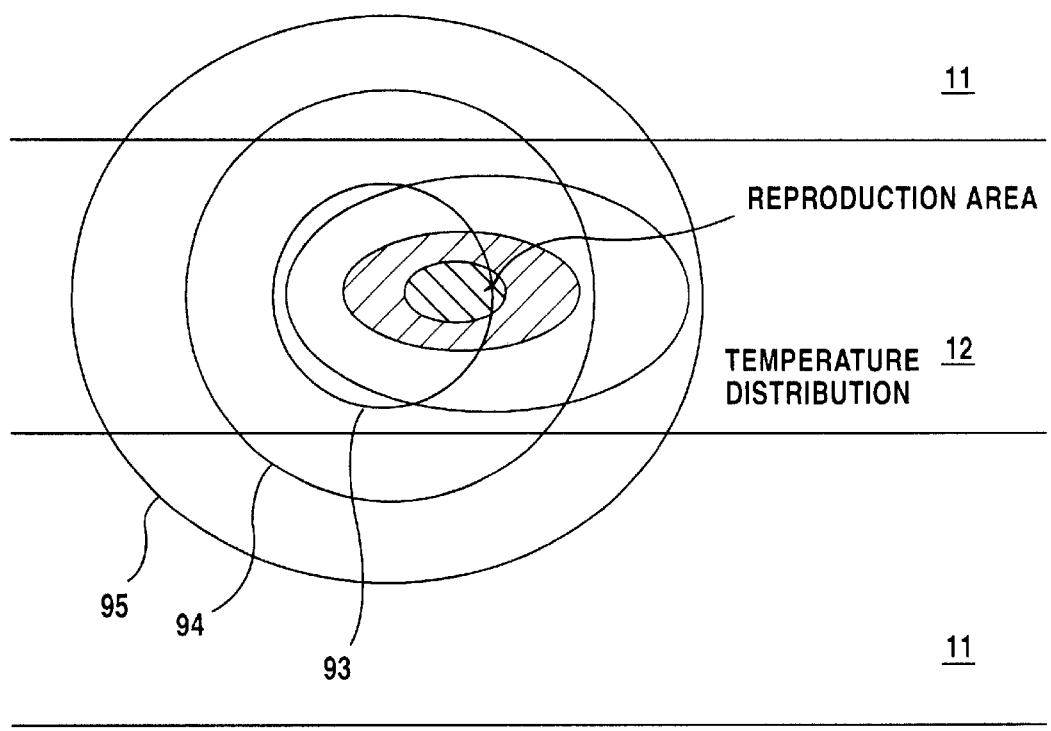
FIG. 40 shows a radiation state of a laser beam on a magneto-optic disk when the FIG. 35 round light blocker is used.

When round light blocker 86 shown in FIG. 35 is used to reproduce a signal from a magneto-optic disk, a laser beam forms concentrical main lobe 93 and side lobes 94 and 95, as shown in FIG. 40. For a round light blocker 87, a light blocking ratio of less than 0.4 provides an intensity ratio of less than 0.6, as shown in FIG. 38, so that the temperature of the portion irradiated with the side lobes does not exceed 150° C. and the reproduction from land 11 can thus be prevented.

Thus the super-resolution magneto-optic disk eliminates the necessity of preventing a side lobe generated by optical super-resolution from illuminating the disk. This further simplifies the optical system employed in the reproduction device.

Figure 41:
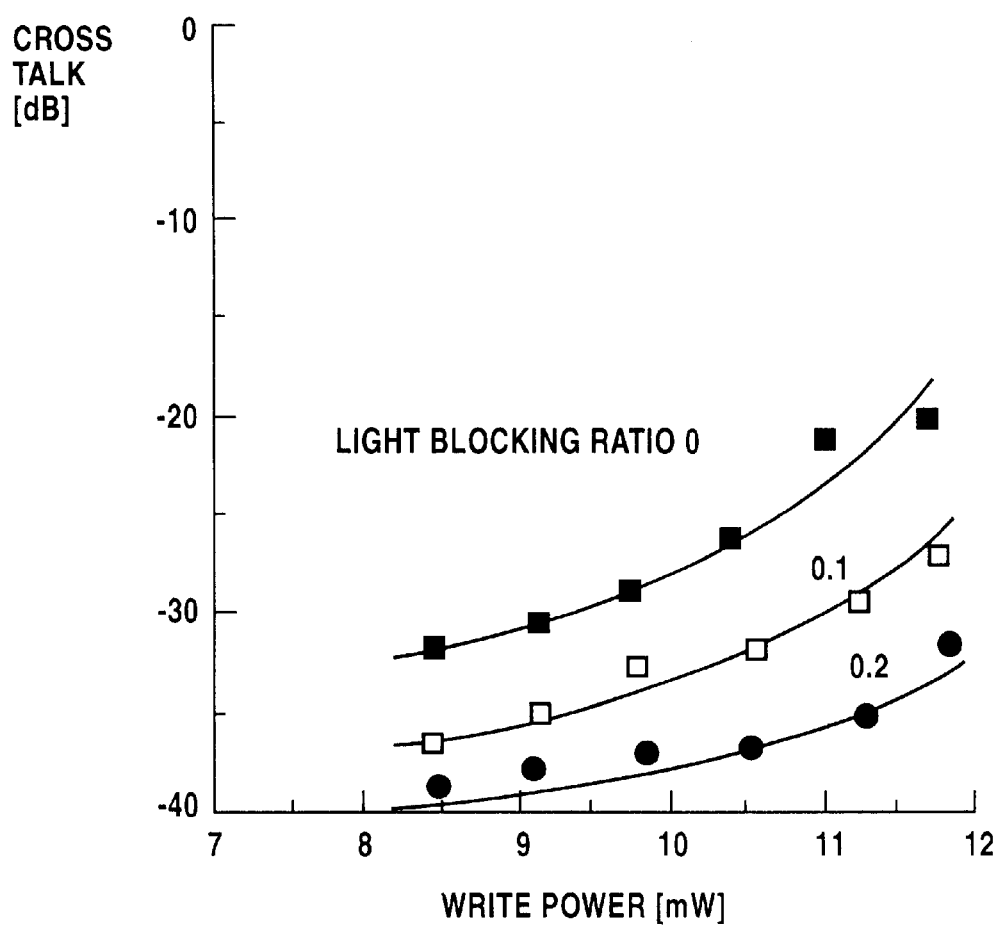
FIG. 41 is a graph of cross talk versus write power for the FIG. 24 optical head for various light blocking ratios.

As shown in FIG. 41, a cross talk provided when a laser beam is blocked is smaller than that provided when a laser beam is not blocked (i.e. for a light blocking ratio of zero). More specifically, as light blocking ratio increases from 0.1 to 0.2, cross talk decreases.

For the present embodiment, a signal is reproduced from a magneto-optic disk according to Partial Response (PR) and the signal processing system is PR (1, 1), although it is not limited to PR (1, 1) and may be any other systems.

The recording capacity of the magneto-optic disk according to the present embodiment is not limited to those shown in Table 2 and 3 and may be those indicated in Table 9. Table 9 represents a relation between the totaled recording capacity of a magneto-optic disk and the track pitch and bit density of the magneto-optic disk.

As is apparent from Table 10, when a laser beam has a wavelength of 600 to 690 nm and the objective lens has a numerical aperture of 0.53 to 0.70, the spot of the laser beam radiated to a magneto-optic disk has a diameter of 0.703 to

TABLE 9

| TOTAL RECORDING CAPACITY (Gbyts) | | | | | | | TRACK PITCH (μm) | | | | | | | | |
|---|---|---|---|---|---|---|---|---|---|---|---|---|---|---|---|
| BIT DENSITY (μm/bit) | 0.7 | 0.65 | 0.62 | 0.6 | 0.57 | 0.55 | 0.53 | 0.5 | 0.48 | 0.45 | 0.42 | 0.4 | 0.38 | 0.35 | 0.3 |
| 0.3 | 4.308 | 4.64 | 4.864 | 5.026 | 5.29 | 5.48 | 5.69 | 6.032 | 6.283 | 6.702 | 7.181 | 7.54 | 7.94 | 8.617 | 10.1 |
| 0.29 | 4.457 | 4.8 | 5.032 | 5.2 | 5.47 | 5.67 | 5.886 | 6.24 | 6.5 | 6.933 | 7.428 | 7.8 | 8.21 | 8.914 | 10.4 |
| 0.28 | 4.616 | 4.971 | 5.212 | 5.385 | 5.67 | 5.88 | 6.097 | 6.463 | 6.732 | 7.181 | 7.693 | 8.08 | 8.5 | 9.232 | 10.8 |
| 0.27 | 4.787 | 5.155 | 5.405 | 5.585 | 5.88 | 6.09 | 6.323 | 6.702 | 6.981 | 7.447 | 7.978 | 8.38 | 8.82 | 9.574 | 11.2 |
| 0.26 | 4.971 | 5.354 | 5.613 | 5.8 | 6.1 | 6.33 | 6.566 | 6.96 | 7.25 | 7.733 | 8.285 | 8.7 | 9.16 | 9.942 | 11.6 |
| 0.25 | 5.17 | 5.568 | 5.837 | 6.032 | 6.35 | 6.58 | 6.828 | 7.238 | 7.54 | 8.042 | 8.617 | 9.05 | 9.52 | 10.34 | 12.1 |
| 0.24 | 5.385 | 5.8 | 6.08 | 6.283 | 6.61 | 6.85 | 7.113 | 7.54 | 7.854 | 8.377 | 8.976 | 9.42 | 9.92 | 10.77 | 12.6 |
| 0.23 | 5.62 | 6.052 | 6.345 | 6.556 | 6.9 | 7.15 | 7.422 | 7.867 | 8.195 | 8.742 | 9.366 | 9.83 | 10.4 | 11.24 | 13.1 |
| 0.22 | 5.875 | 6.327 | 6.633 | 6.854 | 7.21 | 7.48 | 7.759 | 8.225 | 8.568 | 9.139 | 9.792 | 10.3 | 10.8 | 11.75 | 13.7 |
| 0.21 | 6.155 | 6.628 | 6.949 | 7.181 | 7.56 | 7.83 | 8.129 | 8.617 | 8.976 | 9.574 | 10.26 | 10.8 | 11.3 | 12.31 | 14.4 |
| 0.2 | 6.463 | 6.96 | 7.296 | 7.54 | 7.94 | 8.23 | 8.535 | 9.048 | 9.425 | 10.05 | 10.77 | 11.3 | 11.9 | 12.93 | 15.1 |
| 0.19 | 6.803 | 7.326 | 7.68 | 7.936 | 8.35 | 8.66 | 8.985 | 9.524 | 9.921 | 10.58 | 11.34 | 11.9 | 12.5 | 13.61 | 15.9 |
| 0.18 | 7.181 | 7.733 | 8.107 | 8.377 | 8.82 | 9.14 | 9.484 | 10.05 | 10.47 | 11.17 | 11.97 | 12.6 | 13.2 | 14.36 | 16.8 |
| 0.17 | 7.603 | 8.188 | 8.584 | 8.87 | 9.34 | 9.68 | 10.04 | 10.64 | 11.09 | 11.83 | 12.67 | 13.3 | 14 | 15.21 | 17.7 |
| 0.16 | 8.078 | 8.7 | 9.12 | 9.425 | 9.92 | 10.3 | 10.67 | 11.31 | 11.78 | 12.57 | 13.46 | 14.1 | 14.9 | 16.16 | 18.8 |
| 0.15 | 8.617 | 9.28 | 9.729 | 10.05 | 10.6 | 11 | 11.38 | 12.06 | 12.57 | 13.4 | 14.36 | 15.1 | 15.9 | 17.23 | 20.1 |
| 0.14 | 9.232 | 9.942 | 10.42 | 10.77 | 11.3 | 11.8 | 12.19 | 12.93 | 13.46 | 14.36 | 15.39 | 16.2 | 17 | 18.46 | 21.5 |
| 0.13 | 9.942 | 10.71 | 11.23 | 11.6 | 12.2 | 12.7 | 13.13 | 13.92 | 14.5 | 15.47 | 16.57 | 17.4 | 18.3 | 19.88 | 23.2 |
| 0.12 | 10.77 | 11.6 | 12.16 | 12.57 | 13.2 | 13.7 | 14.23 | 15.08 | 15.71 | 16.75 | 17.95 | 18.8 | 19.8 | 21.54 | 25.1 |
| 0.11 | 11.75 | 12.65 | 13.27 | 13.71 | 14.4 | 15 | 15.52 | 16.45 | 17.14 | 18.28 | 19.58 | 20.6 | 21.6 | 23.5 | 27.4 |
| 0.1 | 12.93 | 13.92 | 14.59 | 15.08 | 15.9 | 16.5 | 17.07 | 18.1 | 18.85 | 20.11 | 21.54 | 22.6 | 23.8 | 25.85 | 30.2 |
| 0.09 | 14.36 | 15.47 | 16.21 | 16.75 | 17.6 | 18.3 | 18.97 | 20.11 | 20.94 | 22.34 | 23.94 | 25.1 | 26.5 | 28.72 | 33.5 |
| 0.08 | 16.16 | 17.4 | 18.24 | 18.85 | 19.8 | 20.6 | 21.34 | 22.62 | 23.56 | 25.13 | 26.93 | 28.3 | 29.8 | 32.31 | 37.7 |
| 0.07 | 18.46 | 19.88 | 20.85 | 21.54 | 22.7 | 23.5 | 24.39 | 25.85 | 26.93 | 28.72 | 30.77 | 32.3 | 34 | 36.93 | 43.1 |
| 0.06 | 21.54 | 23.2 | 24.32 | 25.13 | 26.5 | 27.4 | 28.45 | 30.16 | 31.42 | 33.51 | 35.9 | 37.7 | 39.7 | 43.08 | 50.3 |
| 0.05 | 25.85 | 27.84 | 29.19 | 30.16 | 31.7 | 32.9 | 34.14 | 36.19 | 37.7 | 40.21 | 43.08 | 45.2 | 47.6 | 51.7 | 60.3 |

As is understood from Table 9, a track pitch of 0.3 to 0.7 μm and a bit density of 0.07 to 0.16 μm/bit result in a recording capacity of 8 to 20 Gbytes for the magneto-optic disk.

The recording capacity of 8 to 20 Gbytes can be obtained by employing the optical head described above, wherein laser beam wavelength and the numerical aperture (NA) of the objective lens are derived from Table 10 representing a relation between the diameter of the spot of a laser beam provided, and the wavelength of the laser beam and the numerical aperture (NA) of the objective lens.

1.07 μm. For example, to achieve a recording capacity of 12 Gbytes with a magneto-optic disk substrate thickness of 0.6 mm, a track pitch of 0.50 μm and with a bit density of 0.15 μm/bit, the laser beam has a wavelength of 635 nm and the objective lens has a numerical aperture of 0.6.

Reproduction characteristics of the recording/reproduction device according to the second embodiment will now be described.

Figure 42:
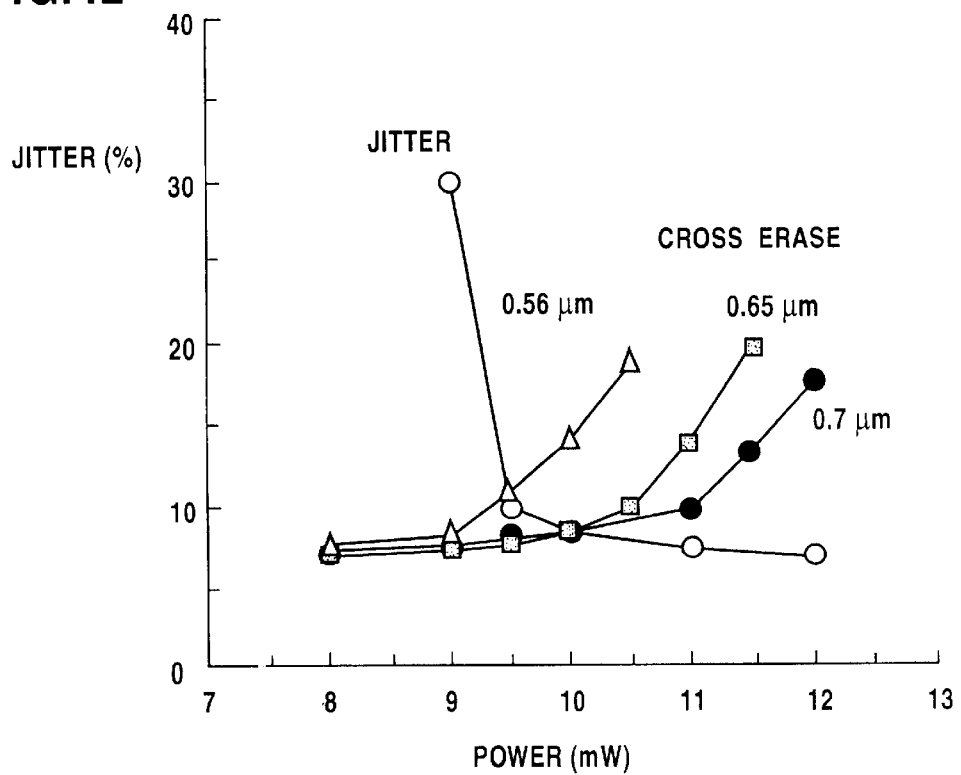
FIG. 42 is a graph of jitter in reproduction versus write power when the FIG. 24 optical head is employed to form a laser beam spot into an ellipse extending in a tracking direction (i.e. a direction perpendicular to a direction in which a track runs).

FIG. 42 represents the dependency of the jitter in reproduction on write power when a laser beam is radiated to a magneto-optic disk in the manner shown in FIG. 39. In FIG.

TABLE 10

| DIAMETER OF SPOT (μm) | | | | | | NA OF LENSE | | | | | | | | | |
|---|---|---|---|---|---|---|---|---|---|---|---|---|---|---|---|
| WAVELENGTH OF LASER (nm) | 0.3 | 0.35 | 0.4 | 0.45 | 0.5 | 0.51 | 0.52 | 0.53 | 0.55 | 0.6 | 0.65 | 0.7 | 0.75 | 0.8 | 0.9 |
| 780 | 2.13 | 1.829 | 1.599 | 1.421 | 1.28 | 1.25 | 1.23 | 1.21 | 1.163 | 1.07 | 0.984 | 0.914 | 0.853 | 0.8 | 0.711 |
| 690 | 1.89 | 1.617 | 1.415 | 1.257 | 1.13 | 1.11 | 1.088 | 1.07 | 1.029 | 0.94 | 0.87 | 0.808 | 0.754 | 0.707 | 0.629 |
| 680 | 1.86 | 1.593 | 1.394 | 1.239 | 1.12 | 1.09 | 1.072 | 1.05 | 1.014 | 0.93 | 0.858 | 0.797 | 0.743 | 0.697 | 0.62 |
| 670 | 1.83 | 1.57 | 1.374 | 1.221 | 1.1 | 1.08 | 1.057 | 1.04 | 0.999 | 0.92 | 0.845 | 0.785 | 0.733 | 0.687 | 0.61 |
| 660 | 1.8 | 1.546 | 1.353 | 1.203 | 1.08 | 1.06 | 1.041 | 1.02 | 0.984 | 0.9 | 0.833 | 0.773 | 0.722 | 0.677 | 0.601 |
| 650 | 1.78 | 1.523 | 1.333 | 1.184 | 1.07 | 1.05 | 1.025 | 1.01 | 0.969 | 0.89 | 0.82 | 0.761 | 0.711 | 0.666 | 0.592 |
| 640 | 1.75 | 1.499 | 1.312 | 1.166 | 1.05 | 1.03 | 1.009 | 0.99 | 0.954 | 0.87 | 0.807 | 0.75 | 0.7 | 0.656 | 0.583 |
| 630 | 1.72 | 1.476 | 1.292 | 1.148 | 1.03 | 1.01 | 0.993 | 0.97 | 0.939 | 0.86 | 0.795 | 0.738 | 0.689 | 0.646 | 0.574 |
| 620 | 1.69 | 1.453 | 1.271 | 1.13 | 1.02 | 1 | 0.978 | 0.96 | 0.924 | 0.85 | 0.782 | 0.726 | 0.678 | 0.636 | 0.565 |
| 610 | 1.67 | 1.429 | 1.251 | 1.112 | 1 | 0.98 | 0.962 | 0.94 | 0.909 | 0.83 | 0.77 | 0.715 | 0.667 | 0.625 | 0.556 |
| 600 | 1.64 | 1.406 | 1.23 | 1.093 | 0.98 | 0.96 | 0.946 | 0.93 | 0.895 | 0.82 | 0.757 | 0.703 | 0.656 | 0.615 | 0.547 |
| 550 | 1.5 | 1.289 | 1.128 | 1.002 | 0.9 | 0.88 | 0.867 | 0.85 | 0.82 | 0.75 | 0.694 | 0.644 | 0.601 | 0.564 | 0.501 |
| 500 | 1.37 | 1.171 | 1.025 | 0.911 | 0.82 | 0.8 | 0.788 | 0.77 | 0.745 | 0.68 | 0.631 | 0.586 | 0.547 | 0.513 | 0.456 |
| 450 | 1.23 | 1.054 | 0.923 | 0.82 | 0.74 | 0.72 | 0.71 | 0.7 | 0.671 | 0.62 | 0.568 | 0.527 | 0.492 | 0.461 | 0.41 |
| 400 | 1.09 | 0.937 | 0.82 | 0.729 | 0.66 | 0.64 | 0.631 | 0.62 | 0.596 | 0.55 | 0.505 | 0.469 | 0.437 | 0.41 | 0.364 |
| 350 | 0.96 | 0.82 | 0.718 | 0.638 | 0.57 | 0.56 | 0.552 | 0.54 | 0.522 | 0.48 | 0.442 | 0.41 | 0.383 | 0.359 | 0.319 |

42, Δ, ■ and ● represent various relations between the jitter caused in reproducing a signal first recorded on one track and the power to further record signals on the tracks located on the both sides of the track. ○ represents the jitter caused in reproducing a signal newly recorded on a track on which any signals have not been recorded and the power used to record the signal. Δ, ■ and ● represent a variety of relations as described above for track pitches of 0.56 μm, 0.65 μm and 0.7 μm, respectively.

Practically, laser beam has a generally ellipsoidal shape rather than round shape. A laser beam provided in the present embodiment has a longer diameter of 1.21 μm and a shorter diameter of 1.08 μm. In FIG. 42, a laser beam is radiated such that the longer diameter of the laser beam is in the tracking direction of a magneto-optic disk. The laser beam has a wavelength of 685 nm and the objective lens has a numerical aperture of 0.55.

As indicated by ○ in FIG. 42, in recording a new signal on a track on which any signals have not been recorded, a write power exceeding 9.5 mW results in a rapid reduction in jitter and a write power exceeding 10 mW results in a jitter of less than 10%. As indicated by Δ, ■ and 574, when signals are recorded on the tracks located on the both sides of a track on which a signal has been previously recorded, the jitter caused in reproducing the signal previously recorded increases with elevation of write power and a laser power of 9 to 12 mW results in a reproduction jitter of greater than 10%. Thus it is preferable to set a recording laser power to obtain sufficiently small reproduction jitter in the both cases described above. For the present embodiment, a recording laser power of 9.5 to 11.5 mW is preferably set to obtain a reproduction jitter of less than 12.5%.

Figure 43:
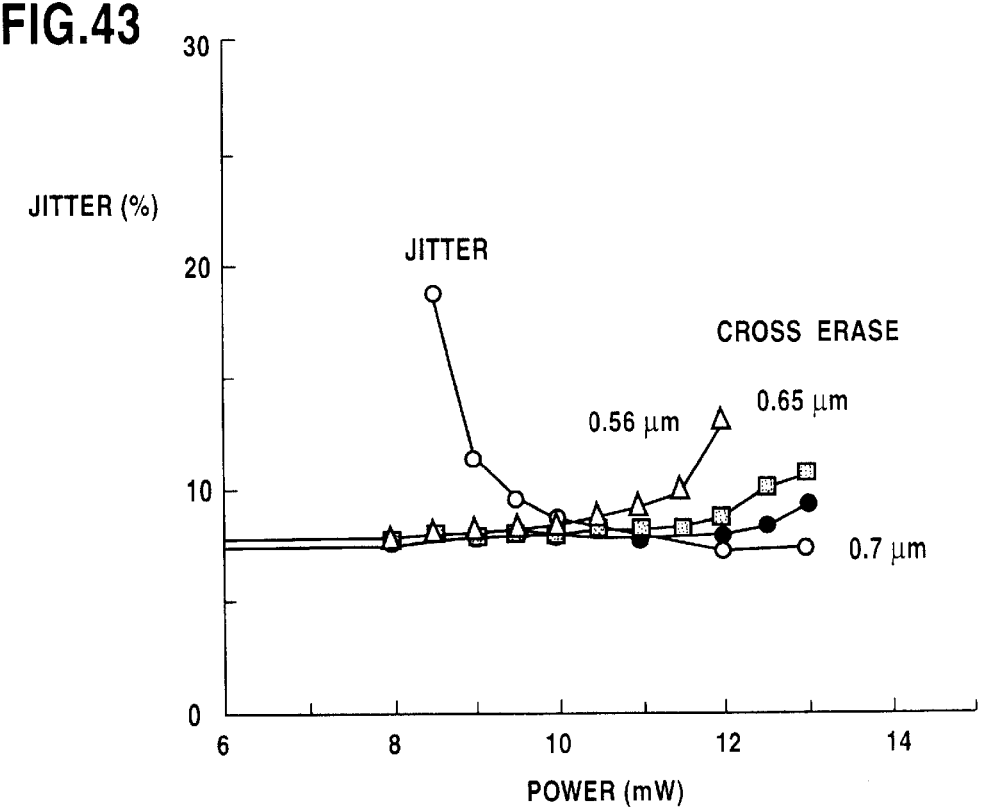
FIG. 43 is a graph of jitter in reproduction versus write power when the FIG. 24 optical head is employed to form a laser beam spot into an ellipse extending in a direction in which a track runs.

FIG. 43 represents a relation between recording laser power and the reproduction jitter caused when a laser beam is radiated in the manner shown in FIG. 39, i.e. such that the longer diameter of the laser beam runs in the direction in which a track of a magneto-optic disk runs. Other conditions are the same as those in FIG. 42. As is apparent from FIG. 43, when a laser beam is radiated with its longer diameter running in the direction in which the track runs, reproduction jitter can be reduced more generally and the range of the write power that provides a jitter of less than 12.5% is wider in FIG. 43 than FIG. 42. Accordingly, a laser power provided in this example can be set in a range of 9 to 13 mW.

Thus, reproduction jitter can further be reduced when a laser beam is radiated with its longer diameter running in the direction in which a track of a magneto-optic disk runs.

Figure 44:
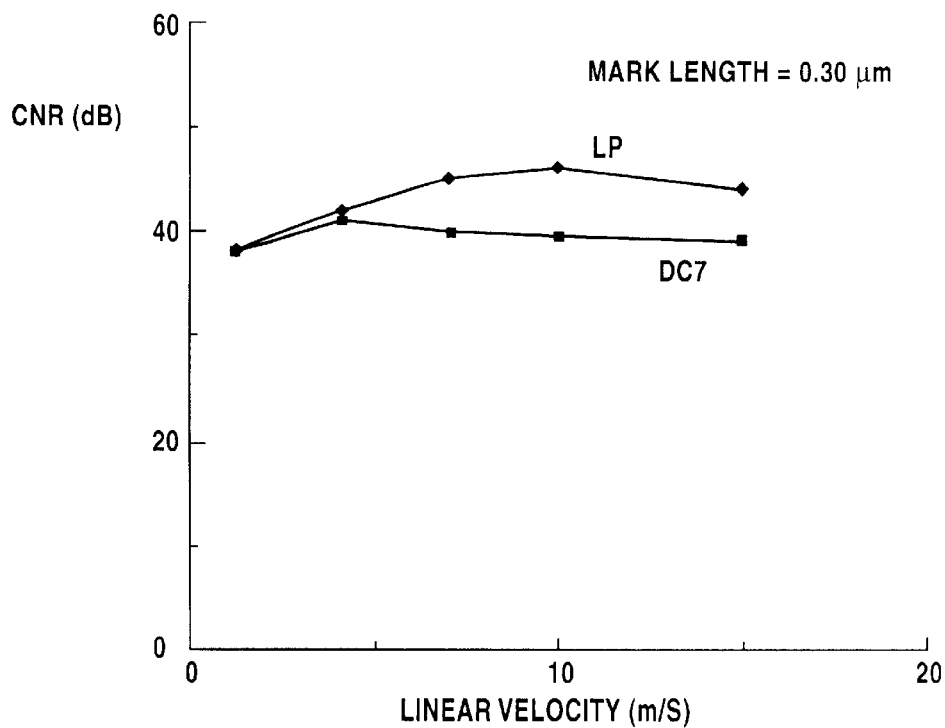
FIG. 44 is a graph of the CN ratio versus linear velocity in reproduction for the FIG. 24 optical head.

As shown in FIG. 44, the CN ratio provided by pulsed laser beam (LP) is larger than that provided by continuously radiated laser beam (TC), for a linear velocity of greater than 5 m/sec.

Figure 45:
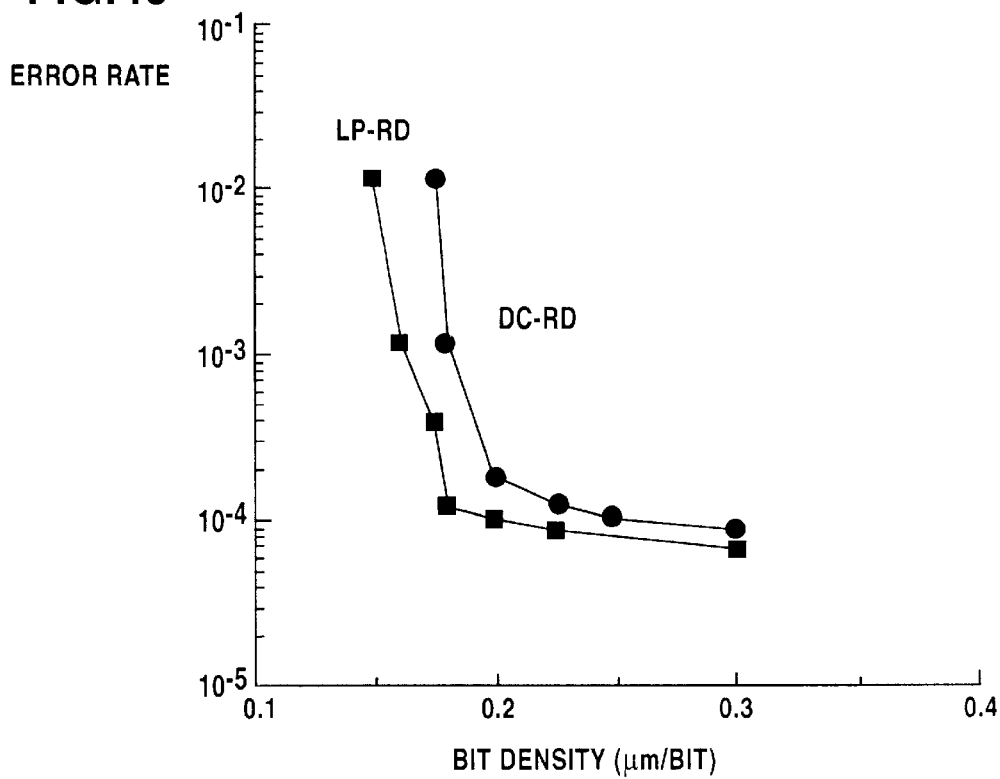
FIG. 45 is a graph of error rate in reproduction versus bit density when the FIG. 24 optical head is employed to radiate a continuous laser beam and a pulsed laser beam in reproduction.
Figure 46:
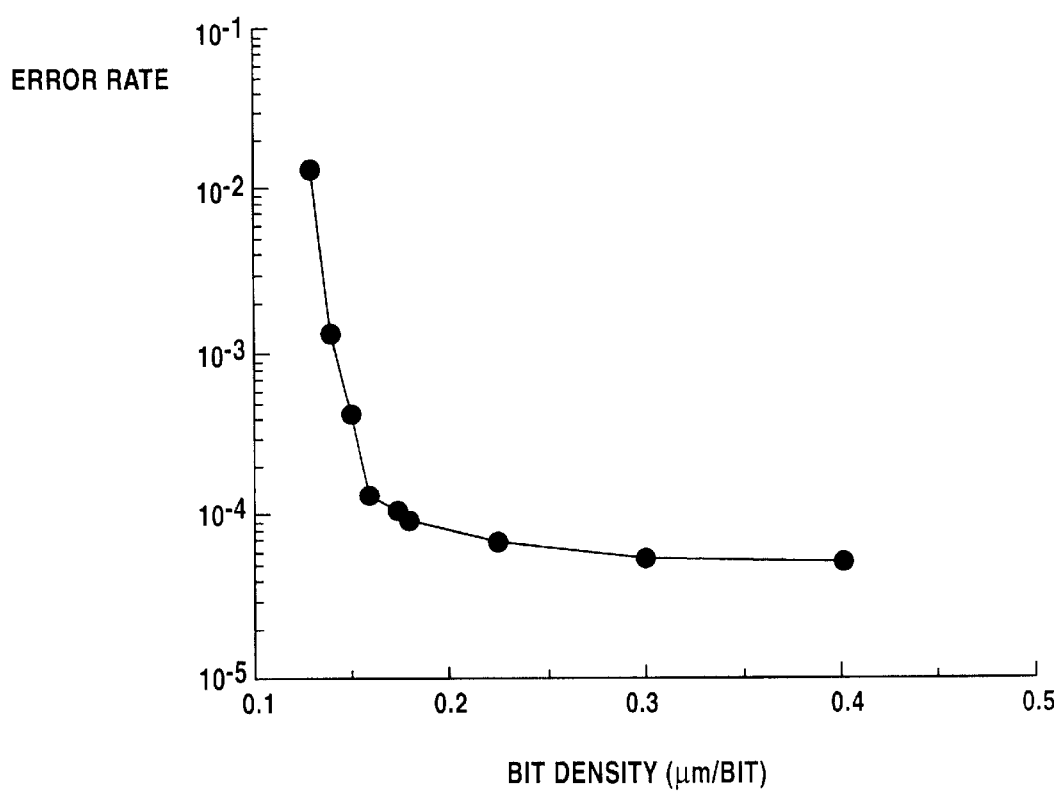
FIG. 46 is a graph of error rate in reproduction versus bit density when the FIG. 24 optical head is used to pulse a laser beam and Partial Response (PR) is employed to reproduce a signal.

As shown in FIG. 45, the error rate provided when a signal is reproduced with pulsed laser beam (LP-RD) is lower than that provided when a signal is reproduced with continuous laser beam (DC-RD). As is apparent from FIG. 45, pulsed laser beam allows error rate to be smaller than $10^{-4}$ with a bit density reduced from 0.225 μm/bit to as low as 0.18 μm/bit. The application of optical super-resolution to an optical head and the signal process according to Partial Response ensure a sufficiently low error rate with a bit density reduced to as low as 0.15 μm/bit, as shown in FIG. 46.

While transparent electrodes 62 and 63 shown in FIG. 25 are not patterned, a transparent electrode may be used which is patterned concentrically and divided into the center and the outer periphery. When voltage is applied selectively to the center and the outer periphery, the center and outer periphery of a laser beam can be selectively blocked. An optical head having such a polarization rotating unit allows not only recording on/reproduction from magneto-optic disks but also reproduction from compact disks (CDs) dedicated to reproduction. A polarizing filter of such an optical head is provided with a polarizing film corresponding to not only the center but also the entirety of a laser beam.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording/reproduction device for a magneto-optic recording medium capable of recording information according to optical super-resolution; comprising:

supply means responsive to recording signal indicative of said information to be recorded for supplying a magnetic field to said magneto-optical recording medium;

radiation means for radiating a laser beam to said magneto-optic recording medium;

pulsing means for pulsing said laser beam upon reproducing information from said magneto-optic recording medium;

blocking means for blocking a center of said laser beam in reproduction;

wherein said blocking means includes:

rotation means for selectively rotating a plane of polarization of said laser beam; and a polarizing element receiving said laser beam from said rotation means and having a predetermined polarization direction;

wherein:

said rotation means rotates an entirety of a plane of polarization of said laser beam; and said polarizing element is aligned with said center of said laser beam and the polarization direction of said polarizing element is parallel to a polarization direction of the rotated plane of polarization.

2. The recording/reproduction device according to claim 1, wherein a duty ratio of said pulsed laser beam is approximately 20 to 50% and a phase difference between said pulsed laser beam and said magnetic field is approximately 0 to 50 nsec.

3. The recording/reproduction device according to claim 1 wherein a rising/falling time of said magnetic field is approximately 20 to 160 nsec.

4. The recording/reproduction device according to claim 3, wherein a rising/falling time of said magnetic field is approximately 95 to 160 nsec.

5. The recording/reproduction device according to claim 1, further comprising formation means for forming a spot of said laser beam radiated to said magneto-optic recording medium into an ellipse extending in a direction in which a track of said magneto-optic recording medium runs.

* * * * *

UNITED STATES PATENT AND TRADEMARK OFFICE
CERTIFICATE OF CORRECTION

PATENT NO.    : 6,243,326 B1
DATED         : June 5, 2001
INVENTOR(S)   : Satoshi Sumi et al.

It is certified that error appears in the above-identified patent and that said Letters Patent is hereby corrected as shown below:

<u>Title page,</u>
Amend [30] the Foreign Application Priority Data so as to read as follows:
Feb. 22, 1996 (JP) ........................... 8-035028.

Signed and Sealed this

Twenty-sixth Day of February, 2002

*Attest:*

JAMES E. ROGAN
*Attesting Officer*       *Director of the United States Patent and Trademark Office*